(12) United States Patent
Hirota et al.

(10) Patent No.: US 11,195,121 B2
(45) Date of Patent: Dec. 7, 2021

(54) MACHINE LEARNING METHOD AND MACHINE LEARNING DEVICE

(71) Applicant: FUJITSU LIMITED, Kawasaki (JP)

(72) Inventors: Keisuke Hirota, Sagamihara (JP); Daiki Hanawa, Kawasaki (JP); Nobuko Takase, Mizuho (JP); Toshihide Miyagi, Kawasaki (JP); Jumma Kudo, Arakawa (JP)

(73) Assignee: FUJITSU LIMITED, Kawasaki (JP)

( * ) Notice: Subject to any disclaimer, the term of this patent is extended or adjusted under 35 U.S.C. 154(b) by 955 days.

(21) Appl. No.: 15/908,408

(22) Filed: Feb. 28, 2018

(65) Prior Publication Data
US 2018/0276567 A1 Sep. 27, 2018

(30) Foreign Application Priority Data
Mar. 24, 2017 (JP) .............................. JP2017-058719

(51) Int. Cl.
| | |
|---|---|
| *G06N 20/00* | (2019.01) |
| *G06F 21/60* | (2013.01) |
| *G06F 16/33* | (2019.01) |
| *G06F 21/62* | (2013.01) |

(52) U.S. Cl.
CPC .......... *G06N 20/00* (2019.01); *G06F 16/334* (2019.01); *G06F 21/602* (2013.01); *G06F 21/6227* (2013.01)

(58) Field of Classification Search
CPC ... G06N 20/00; G06F 21/6227; G06F 16/334; G06F 21/602
See application file for complete search history.

(56) References Cited

U.S. PATENT DOCUMENTS

| | | | |
|---|---|---|---|
| 2013/0159694 A1* | 6/2013 | Chiueh | H04L 9/008 |
| | | | 713/150 |
| 2016/0004936 A1* | 1/2016 | Sawney | G06K 9/6253 |
| | | | 382/159 |

FOREIGN PATENT DOCUMENTS

WO 2015/063905 5/2015

OTHER PUBLICATIONS

Raphael Bost et al., Machine Learning Classification over Encrypted Data, Feb. 8, 2015 (Year: 2015).*

(Continued)

*Primary Examiner* — Vincent Gonzales
(74) *Attorney, Agent, or Firm* — Fujitsu Patent Center

(57) ABSTRACT

A machine learning method includes: obtaining first teacher data, which includes first encrypted words and corresponding search word information including one or more second encrypted words to be used for search, the first encrypted words being generated such that the first encrypted word includes a code sequence different from other encrypted words even though both of the first encrypted words and the other encrypted words have been generated from a same word; obtaining a group of words from among the first encrypted words by using a trapdoor scheme; generating second teacher data by using one encrypted word included in the obtained group to replace a rest of the obtained group of words; and performing, on the basis of the second teacher data, machine learning of a parameter to determine, in response to receiving of one or more encrypted words, one or more encrypted words to be used for search.

13 Claims, 23 Drawing Sheets

(56) References Cited

OTHER PUBLICATIONS

Graepel, Thore, Kristin Lauter, and Michael Naehrig. "ML confidential: Machine learning on encrypted data." International Conference on Information Security and Cryptology. Springer, Berlin, Heidelberg, 2012. 21 pages. (Year: 2012).*

Zirtol, Kobra Amiri, Mahnaz Noroozi, and Ziba Eslami. "Multi-user searchable encryption scheme with general access structure." 2015 2nd International Conference on Knowledge-Based Engineering and Innovation (KBEI). IEEE, 2015. 6 pages. (Year: 2015).*

Mariana Raykova, Binh Vo, Steven M. Bellovin, and Tal Malkin. 2009. Secure anonymous database search. In Proceedings of the 2009 ACM workshop on Cloud computing security (CCSW '09). Association for Computing Machinery, New York, NY, USA, 115-126. (Year: 2009).*

* cited by examiner

FIG. 12

| ITEM NUMBER | ENCRYPTED KEYWORD | ADDED KEYWORD |
|---|---|---|
| 1 | KEYWORD A, KEYWORD B | KEYWORD C |
| 2 | KEYWORD D, KEYWORD E | KEYWORD F |
| 3 | KEYWORD G | KEYWORD H |

(FIRST THEATER DATA 131)

| KEYWORD A |
| KEYWORD B |
| KEYWORD C |
| KEYWORD B |
| KEYWORD E |
| KEYWORD F |
| KEYWORD G |
| KEYWORD H |

(ENCRYPTED KEYWORD INFORMATION 133)

| ITEM NUMBER | ENCRYPTED KEYWORD |
|---|---|
| 1 | KEYWORD A |
| 2 | KEYWORD B |
| 3 | KEYWORD C |
| 4 | KEYWORD E |
| 5 | KEYWORD F |
| 6 | KEYWORD G |
| 7 | KEYWORD H |

FIG. 19

| ITEM NUMBER | ENCRYPTED KEYWORD | ADDED KEYWORD |
|---|---|---|
| 1 | KEYWORD A, KEYWORD B | KEYWORD C |
| 2 | KEYWORD E, KEYWORD B | KEYWORD F |
| 3 | KEYWORD G | KEYWORD H |

FIG. 23

(SEARCH CONDITION)

- KEYWORD B
- KEYWORD F
- KEYWORD A
- KEYWORD L
- KEYWORD B
- KEYWORD E
- KEYWORD A (ENCRYPTED KEYWORD INFORMATION 133)

| ITEM NUMBER | ENCRYPTED KEYWORD |
|---|---|
| 1 | KEYWORD A |
| 2 | KEYWORD B |
| 3 | KEYWORD C |
| 4 | KEYWORD E |
| 5 | KEYWORD F |
| 6 | KEYWORD G |
| 7 | KEYWORD H |

MACHINE LEARNING METHOD AND MACHINE LEARNING DEVICE

CROSS-REFERENCE TO RELATED APPLICATION

This application is based upon and claims the benefit of priority of the prior Japanese Patent Application No. 2017-58719, filed on Mar. 24, 2017, the entire contents of which are incorporated herein by reference.

FIELD

The embodiments discussed herein are related to machine learning technology.

BACKGROUND

An operator providing service to users (which operator will hereinafter be also referred to simply as an operator), for example, constructs and operates an information processing system for providing the service.

For example, the operator constructs, as the information processing system, a search system for retrieving desired data from data (hereinafter referred to also as search target data) stored in a search device. Then, a user, for example, inputs a search condition including one or more keywords (hereinafter referred to also as words) to the search device, and obtains data corresponding to the search condition as a search result.

In the search device as described above, when the user inputs a search condition, for example, a keyword related to a keyword included in the search condition is identified by using an evaluation model generated by machine learning of teacher data. Then, the search device performs search based on the search condition including the keyword to which the identified keyword is added. The user may thereby improve search accuracy. A related technology is disclosed in International Publication WO 2015/063905, for example.

SUMMARY

According to an aspect of the embodiments, a machine learning method includes obtaining a first plurality of pieces of teacher data including encrypted words associated with first information indicating words received for search and encrypted words associated with second information indicating words used for search, generating a second plurality of pieces of teacher data in which a first encrypted word is replaced with a second encrypted word on the basis of the first plurality of pieces of teacher data, a plain text of the first encrypted word being equal to a plain text of the second encrypted word, and performing, on the basis of the second plurality of pieces of teacher data, machine learning of a parameter with which an encrypted word associated with the second information is determined in response to receiving an encrypted word associated with the first information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a diagram of assistance in explaining a concrete example of encrypted keywords included in first teacher data;

FIG. 19 is a diagram of assistance in explaining a concrete example of encrypted keywords included in second teacher data;

FIG. 23 is a diagram of assistance in explaining the concrete example of the processing from S42 to S45.

DESCRIPTION OF EMBODIMENTS

In a search system, with the recent spread of a cloud technology, a search device may be disposed on a cloud, for example. In this case, data transmitted to the search device and data transmitted from the search device are transmitted through an external network such as the Internet or the like. Thus, the search system encrypts each piece of data transmitted through the external network.

Here, when a same keyword (hereinafter referred to also as an encrypted keyword or an encrypted word) is generated by encrypting a same keyword (plain text) each time, there is a possibility that the keyword before the encryption may be estimated by an outsider or the like based on a frequency of appearance, a pattern, or the like of the encrypted keyword. Therefore, an operator, for example, encrypts the keyword by using a technology (for example, a retrievable code) that may generate a different encrypted keyword each time from the same keyword. The operator may thereby protect the keyword before the encryption from being estimated.

However, in the conventional technology, when a different encrypted keyword is generated from the same keyword each time, it is difficult for the operator to create teacher data including encrypted keywords. Therefore, in this case, it is difficult for the search device to perform machine learning of the teacher data, so that it is difficult to improve search accuracy.

[Configuration of Information Processing System]

Figure 1:
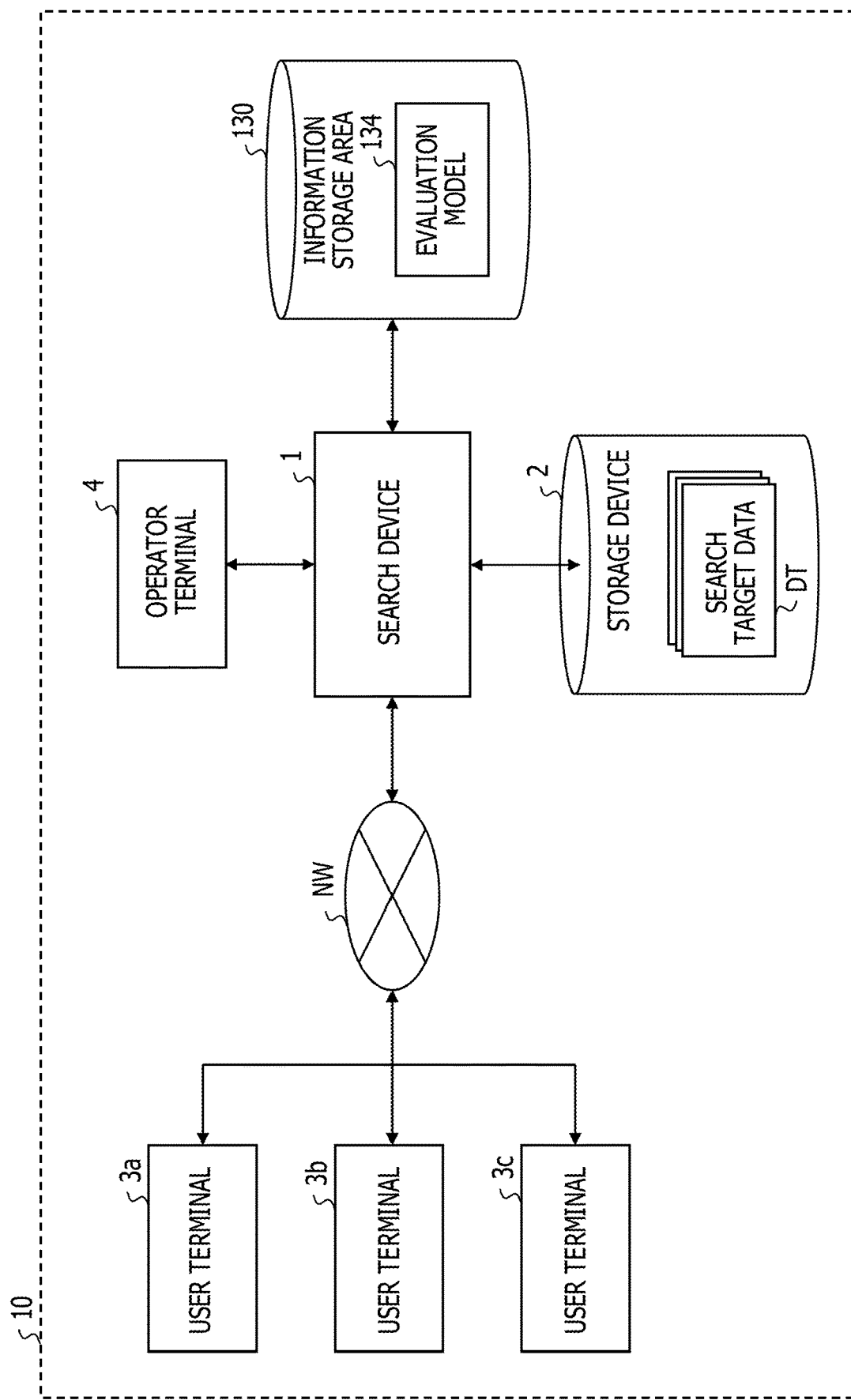
FIG. 1 is a diagram illustrating an entire configuration of an information processing system.

FIG. 1 is a diagram illustrating an entire configuration of an information processing system. The information processing system 10 illustrated in FIG. 1 includes a search device 1 (hereinafter referred to also as an information processing device 1), a storage device 2, a user terminal 3 (hereinafter referred to also as a search terminal 3), and an operator terminal 4. In the example illustrated in FIG. 1, the user terminal 3 includes user terminals 3a, 3b, and 3c.

The search device 1 is, for example, constituted of a plurality of physical machines, and includes a central processing unit (CPU), a memory (dynamic random access memory: DRAM), a hard disk (hard disk drive: HDD), and the like.

The search device 1 performs machine learning of a plurality of pieces of teacher data each including a keyword predicted to be included in a search condition transmitted by a user via the user terminal 3 and a keyword needed to search appropriately for data corresponding to the search condition. For example, the search device 1 performs machine learning of a plurality of pieces of teacher data input by the operator via the operator terminal 4. Then, the search device 1 generates an evaluation model 134 (hereinafter referred to also as a conversion parameter 134) by performing machine learning of the plurality of pieces of teacher data, and stores the evaluation model 134 in an information storage area 130 of the search device 1. Incidentally, in the following, information indicating the keyword predicted to be included in the search condition will be referred to also as first information, and information indicating the keyword needed to search appropriately for the data corresponding to the search condition will be referred to also as second information.

When the search device 1 thereafter receives a search condition transmitted by the user via the user terminal 3, for example, the search device 1 extracts keywords included in the received search condition. For example, the search device 1 extracts keywords by dividing a sentence included in the received search condition into morphemes, for example. Then, in this case, the search device 1 adds new keywords to the extracted keywords by using the evaluation model 134 stored in the information storage area 130.

Further, the search device 1 accesses the storage device 2 storing search target data (hereinafter, search target data DT), and, for example, extracts search target data DT that includes more of the keywords to which the new keywords are added. The search device 1 then transmits the extracted search target data DT as a search result to the user terminal 3 (user terminal 3 that transmitted the search condition).

The user may thereby search for the search target data DT corresponding to the search condition transmitted to the search device 1 by the user.

Here, in the example illustrated in FIG. 1, the search device 1 and the user terminal 3 are, for example, coupled to each other via a network NW such as the Internet. Therefore, in this case, the operator needs to encrypt data going through the network NW (for example, data transmitted to the search device 1 and data transmitted from the search device 1).

In this respect, when a same encrypted keyword is generated by encrypting a same keyword (plain text) each time, there is a possibility that the keyword before the encryption may be estimated based on a frequency of appearance, a pattern, or the like of the encrypted keyword. Therefore, the operator, for example, encrypts the keyword by using a technology (for example, a retrievable code) that may generate a different encrypted keyword from the same keyword each time. The operator may thereby protect the keyword before the encryption from being estimated.

However, when a different encrypted keyword is generated from the same keyword each time, it is difficult for the operator to create teacher data including encrypted keywords. Therefore, in this case, it is difficult for the search device 1 to perform machine learning of the teacher data, so that it is difficult to improve search accuracy.

Accordingly, the search device 1 in the present embodiment obtains a plurality of pieces of teacher data each including an encrypted keyword associated with first information indicating a keyword received from the user terminal 3 and an encrypted keyword associated with second information indicating a word used for search. The search device 1 then extracts encrypted keywords included in the obtained plurality of pieces of teacher data.

Further, the search device 1 generates a plurality of pieces of new teacher data in which, of a plurality of encrypted keywords that are included in the extracted encrypted keywords and whose keywords before encryption match each other, another encrypted keyword than one encrypted keyword is replaced with the one encrypted keyword.

Thereafter, the search device 1 performs machine learning of the evaluation model 134 that converts encrypted keywords associated with the first information among the encrypted keywords included in the generated plurality of pieces of new teacher data to encrypted keywords associated with the second information.

For example, the search device 1 performs machine learning based on new teacher data in which a plurality of kinds of encrypted keywords generated from a same keyword are replaced with one kind of encrypted keyword. When the search device 1 then receives a search condition, the search device 1 replaces encrypted keywords included in the received search condition with encrypted keywords included in the new teacher data, and then performs keyword addition using the evaluation model 134.

Thus, even when a different encrypted keyword is generated from a same keyword each time, the search device 1 may perform machine learning of teacher data including encrypted keywords, so that search accuracy may be improved.

[Hardware Configuration of Search Device]

Figure 2:
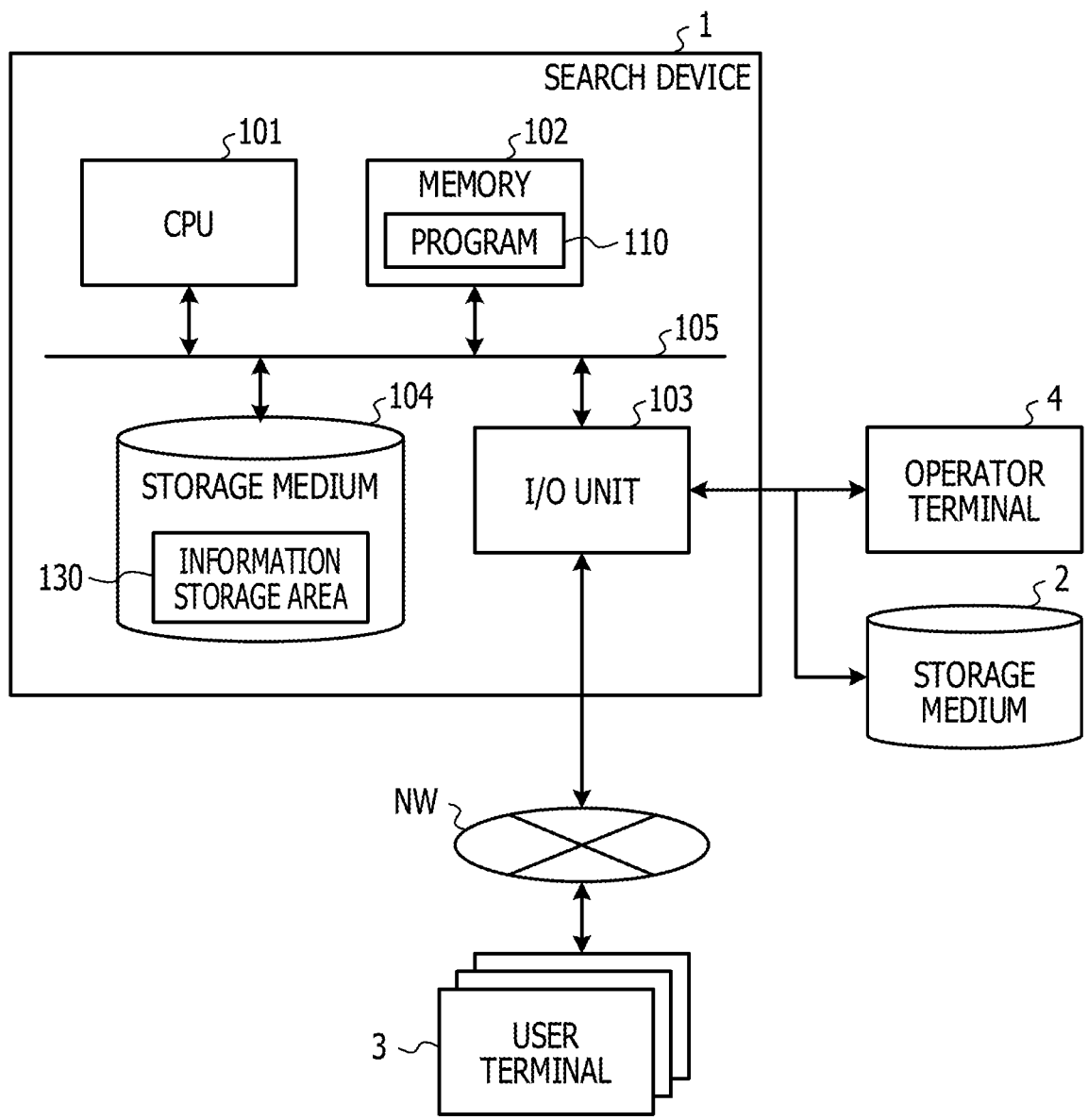
FIG. 2 is a diagram of assistance in explaining a hardware configuration of a search device.

A hardware configuration of the search device 1 will next be described. FIG. 2 is a diagram of assistance in explaining a hardware configuration of the search device 1.

As illustrated in FIG. 2, the search device 1 includes a CPU 101 as a processor, a memory 102, an external interface (input/output(I/O) unit) 103, and a storage medium (storage) 104. The units are coupled to each other via a bus 105.

The storage medium 104 stores a program 110 for performing processing that performs machine learning of encrypted keywords (which processing will hereinafter be referred to also as learning processing) and processing that searches for search target data DT stored in the storage device 2 (which processing will hereinafter be referred to also as search processing) in a program storage area (not illustrated) within the storage medium 104.

As illustrated in FIG. 2, at a time of executing the program 110, the CPU 101 loads the program 110 from the storage medium 104 into the memory 102, and performs the learning processing and the search processing in cooperation with the program 110.

The storage medium 104, for example, includes an information storage area 130 (hereinafter referred to also as a storage unit 130) storing information used when the learning processing and the search processing are performed.

The external interface 103 (I/O unit 103) communicates with the user terminal 3 via the network NW. The external interface 103 also communicates with the storage device 2 and the operator terminal 4.

[Software Configuration of Search Device]

Figure 3:
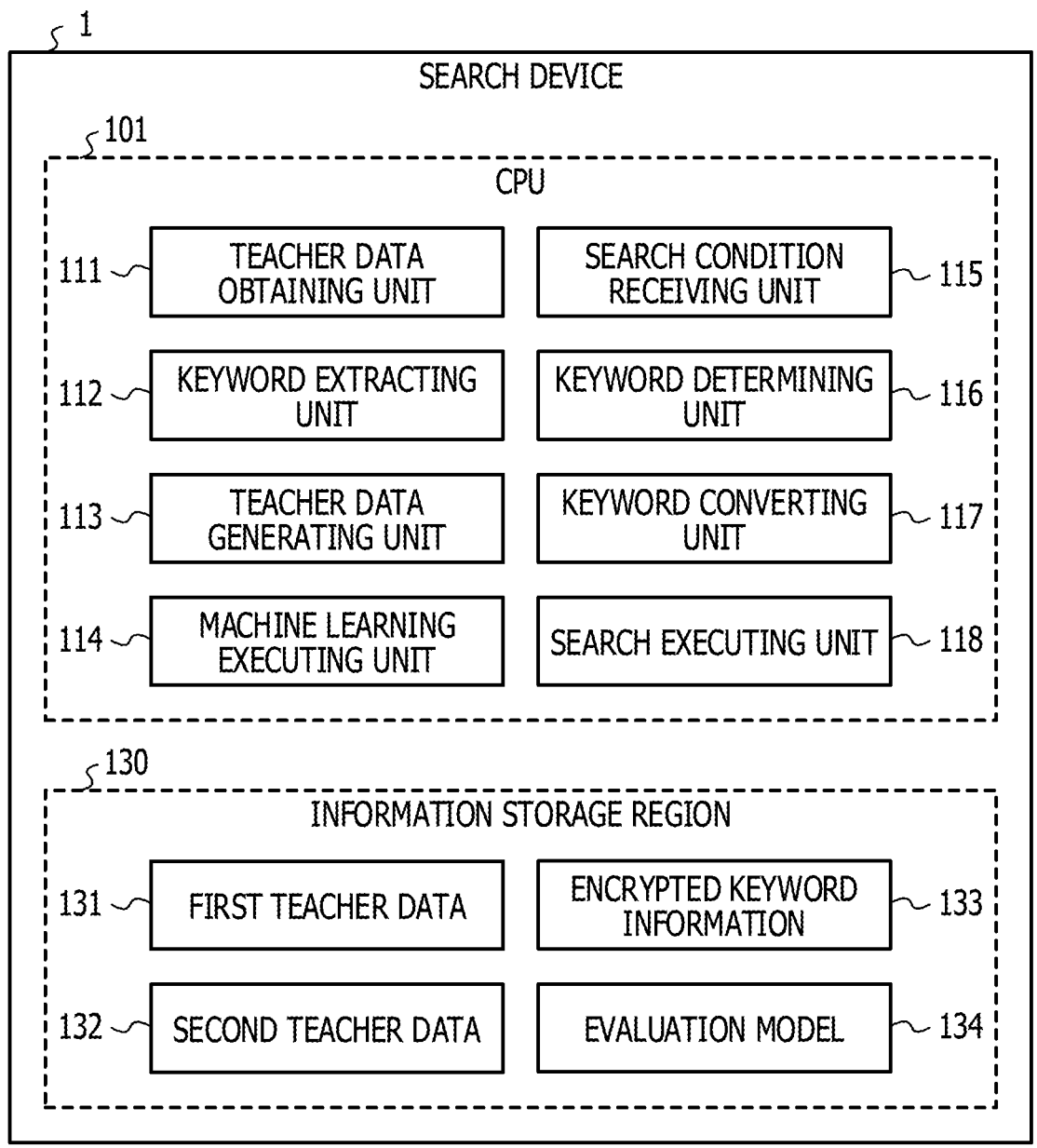
FIG. 3 is a functional block diagram of a search device.

A software configuration of the search device 1 will next be described. FIG. 3 is a functional block diagram of the search device 1.

As illustrated in FIG. 3, the CPU 101 operates as a teacher data obtaining unit 111, a keyword extracting unit 112 (hereinafter referred to also as a word extracting unit 112), a teacher data generating unit 113, and a machine learning executing unit 114 by cooperating with the program 110. In addition, as illustrated in FIG. 3, the CPU 101 operates as a search condition receiving unit 115, a keyword determining unit 116 (hereinafter referred to also as a word determining unit 116), a keyword converting unit 117 (hereinafter referred to also as a word converting unit 117), and a search executing unit 118 by cooperating with the program 110. Further, as illustrated in FIG. 3, the information storage area 130 stores first teacher data 131, second teacher data 132, encrypted keyword information 133 (hereinafter referred to also as an encrypted word group 133), and an evaluation model 134.

The teacher data obtaining unit 111 obtains pieces of first teacher data 131 each including an encrypted keyword associated with first information indicating a keyword received from the user terminal 3 and an encrypted keyword associated with second information indicating a keyword used for search. For example, in response to input of the first teacher data 131 to the information processing device 1 by the operator, the teacher data obtaining unit 111 may obtain the input first teacher data 131. In addition, the teacher data obtaining unit 111 may, for example, obtain the first teacher data 131 stored in the information storage area 130 in advance by the operator.

The keyword extracting unit 112 extracts encrypted keywords included in the first teacher data 131 obtained by the teacher data obtaining unit 111 (encrypted keywords associated with the first information or the second information).

The teacher data generating unit 113 generates second teacher data 132 in which, of a plurality of encrypted keywords that are included in the encrypted keywords extracted by the keyword extracting unit 112 and whose keywords (plain text) before encryption match each other, another encrypted keyword than one encrypted keyword is replaced with the one encrypted keyword.

For example, the teacher data generating unit 113 determines whether or not the encrypted keyword information 133 stored in the information storage area 130 includes an encrypted keyword whose plain text matches that of an encrypted keyword extracted by the keyword extracting unit 112. The encrypted keyword information 133 is information to which encrypted keywords included in the first teacher data 131 are added as needed. Then, when the encrypted keyword information 133 does not include any encrypted keyword whose plain text matches that of an encrypted keyword extracted by the keyword extracting unit 112, the teacher data generating unit 113 adds the encrypted keyword extracted by the keyword extracting unit 112 to the encrypted keyword information 133. When the encrypted keyword information 133 includes an encrypted keyword whose plain text matches that of the encrypted keyword extracted by the keyword extracting unit 112, on the other hand, the teacher data generating unit 113 replaces the encrypted keyword extracted by the keyword extracting unit 112 with the encrypted keyword whose plain text matches among the keywords included in the encrypted keyword information 133.

Incidentally, when each encrypted keyword is encrypted by a retrievable code, the teacher data generating unit 113 may determine whether or not the plain texts of a plurality of encrypted keywords match each other by using trapdoors respectively included in the encrypted keywords extracted by the keyword extracting unit 112, for example.

The machine learning executing unit 114 performs machine learning of the evaluation model 134 that converts encrypted keywords associated with the first information among the encrypted keywords included in the second teacher data 132 generated by the teacher data generating unit 113 into encrypted keywords associated with the second information.

The search condition receiving unit 115, for example, receives a search condition from the user terminal 3 after the machine learning executing unit 114 performs machine learning of the evaluation model 134.

The keyword determining unit 116 determines whether or not the encrypted keyword information 133 stored in the information storage area 130 includes an encrypted keyword whose plain text matches that of an encrypted keyword included in the search condition received by the search condition receiving unit 115.

When the keyword determining unit 116 determines that the encrypted keyword information 133 includes an encrypted keyword whose plain text matches, the keyword converting unit 117 replaces the encrypted keyword included in the search condition received by the search condition receiving unit 115 with the encrypted keyword whose plain text matches among the encrypted keywords included in the encrypted keyword information 133.

Then, by using the evaluation model 134 stored in the information storage area 130, the keyword converting unit 117 converts the encrypted keyword included in the search condition received by the search condition receiving unit 115 or the encrypted keyword replaced by the keyword converting unit 117 into an encrypted keyword associated with the second information. For example, the keyword converting unit 117 adds an encrypted keyword preferably to be added to perform search accurately to the encrypted keyword included in the search condition received by the search condition receiving unit 115 or the encrypted keyword replaced by the keyword converting unit 117.

The search executing unit 118 performs a search using encrypted keywords converted by the keyword converting unit 117 (encrypted keywords associated with the second information).

For example, the search executing unit 118 identifies data including more of the encrypted keywords converted by the keyword converting unit 117 in the search target data DT as encrypted data stored in the storage device 2. Then, the search executing unit 118, for example, transmits the identified data as a search result to the user terminal 3 (user terminal 3 that transmitted the search condition to the search device 1).

Outline of First Embodiment

Figure 4:
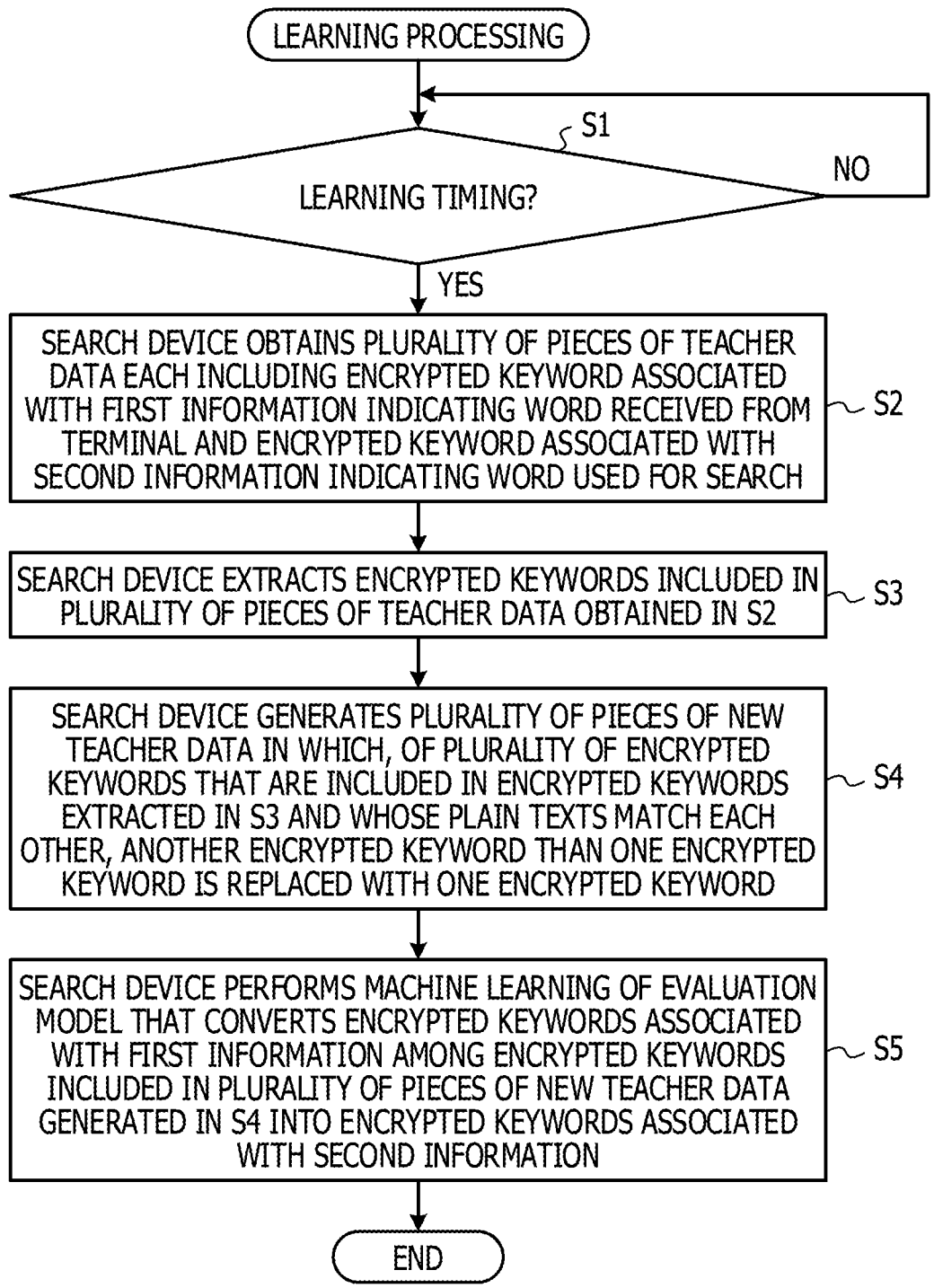
FIG. 4 is a flowchart of assistance in explaining outlines of learning processing and search processing in a first embodiment.
Figure 5:
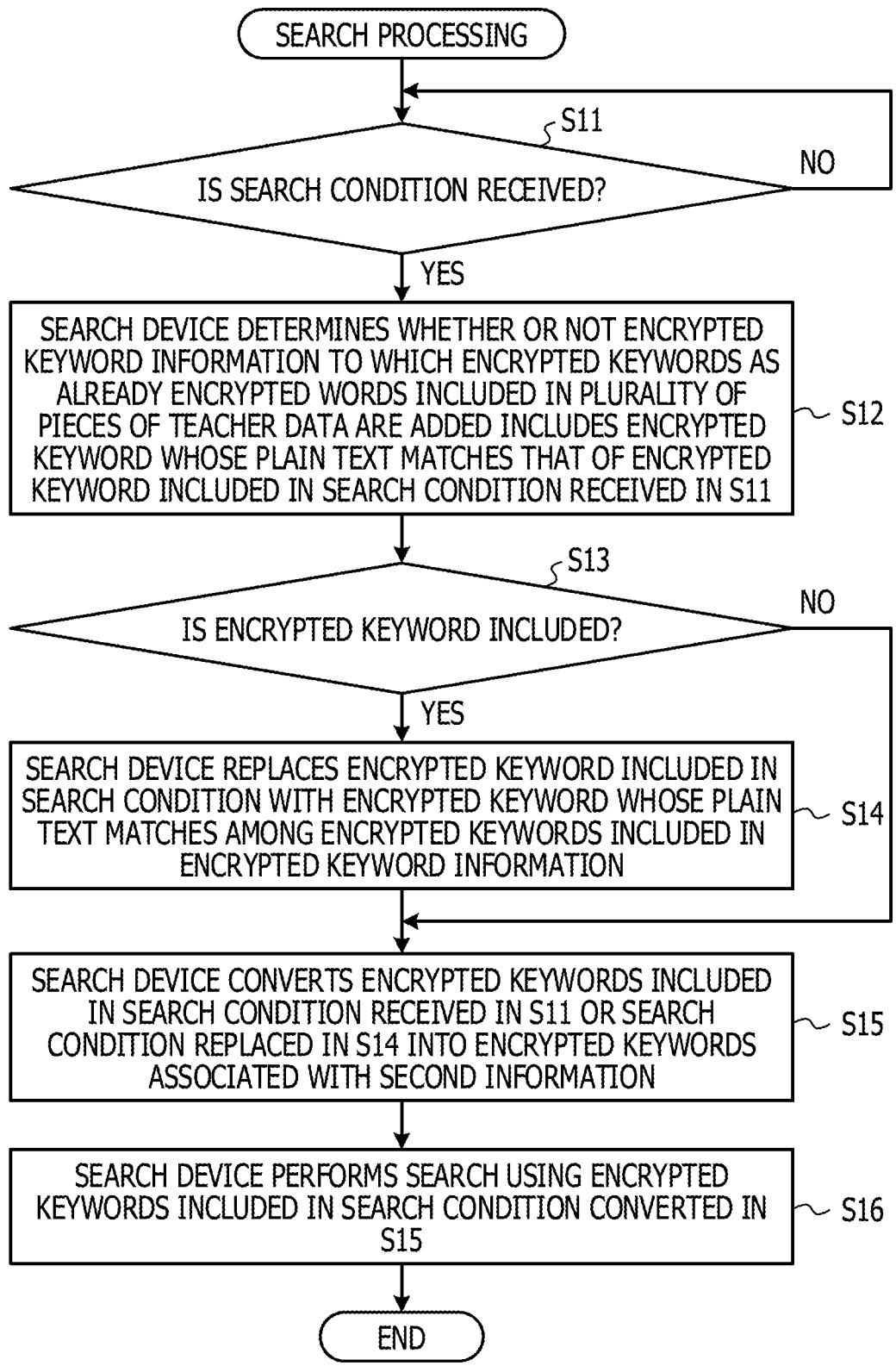
FIG. 5 is a flowchart of assistance in explaining outlines of the learning processing and the search processing in the first embodiment.
Figure 6:
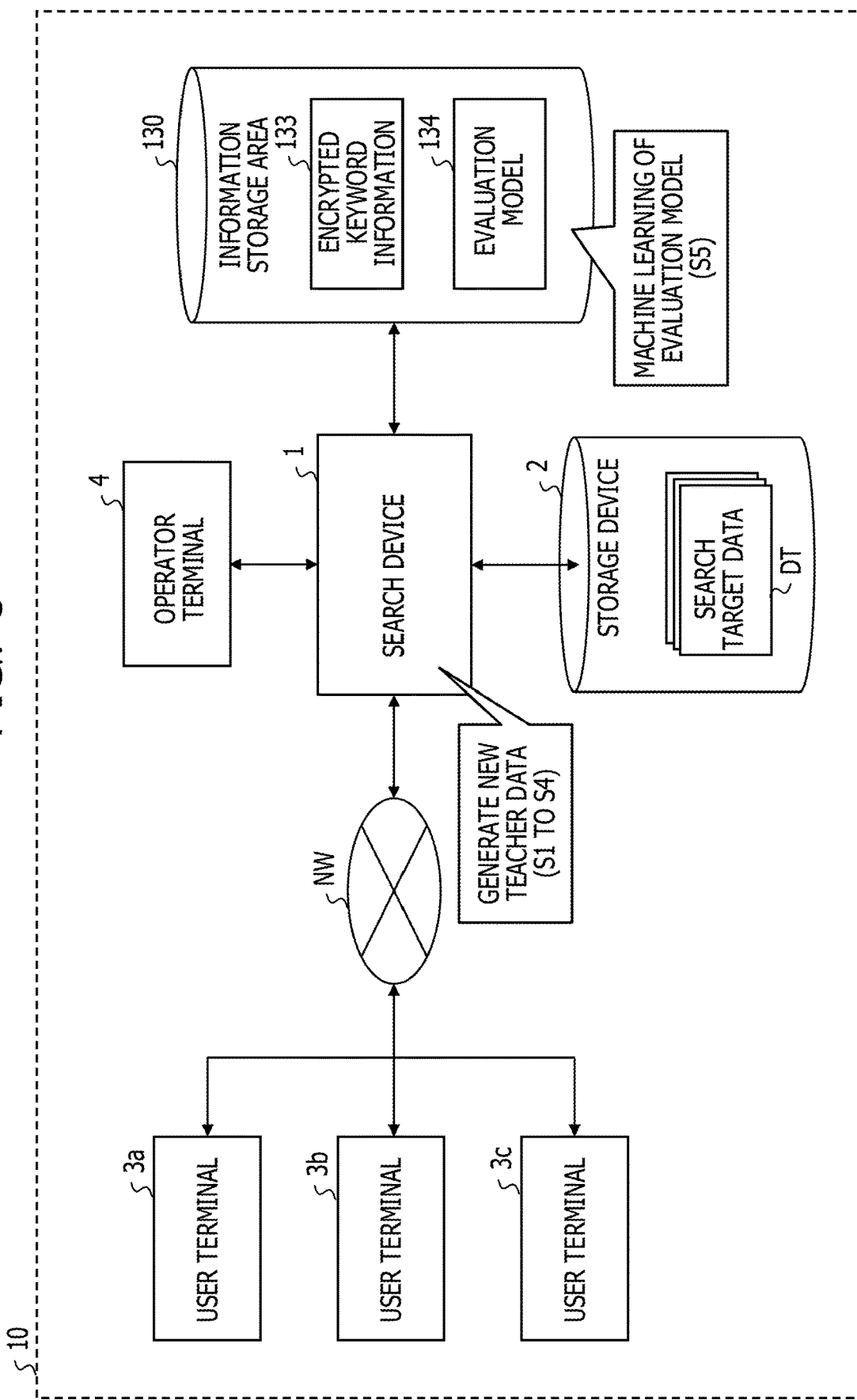
FIG. 6 is a diagram of assistance in explaining outlines of the learning processing and the search processing in the first embodiment.
Figure 7:
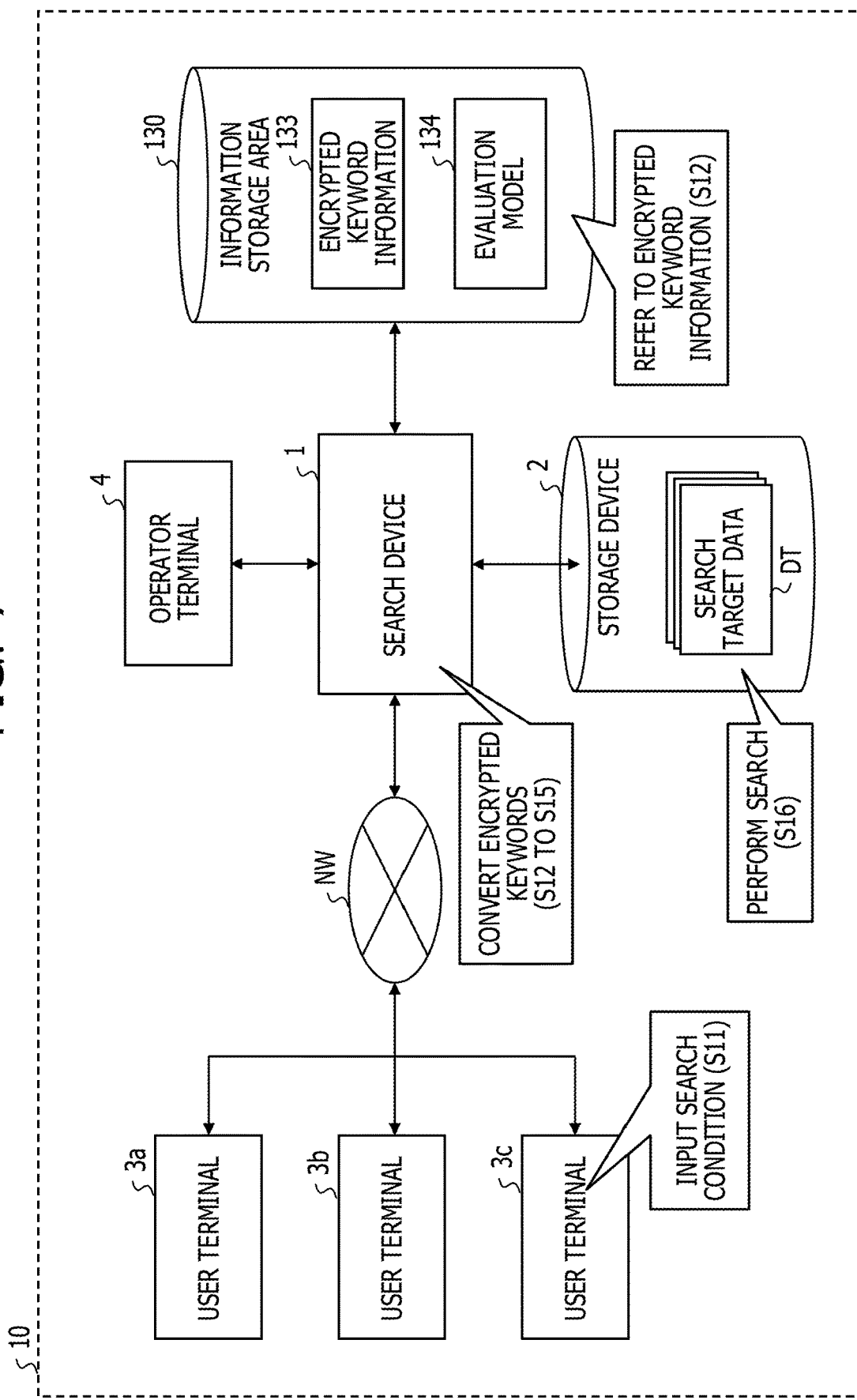
FIG. 7 is a diagram of assistance in explaining outlines of the learning processing and the search processing in the first embodiment.

An outline of a first embodiment will next be described. FIG. 4 and FIG. 5 are flowcharts of assistance in explaining outlines of the learning processing and the search processing in the first embodiment. In addition, FIG. 6 and FIG. 7 are diagrams of assistance in explaining outlines of the learning processing and the search processing in the first embodiment. The learning processing and the search processing in the first embodiment in FIG. 4 and FIG. 5 will be described with reference to FIG. 6 and FIG. 7.

[Outline of Learning Processing]

An outline of the learning processing will first be described. FIG. 4 is a flowchart of assistance in explaining an outline of the learning processing in the first embodiment.

As illustrated in FIG. 4, the search device 1 waits until learning timing (NO in S1). The learning timing may, for example, be timing in which the operator performs input to the effect that machine learning of encrypted keywords will be performed via the operator terminal 4.

When the learning timing then arrives (YES in S1), the search device 1 obtains pieces of first teacher data 131 each including an encrypted keyword associated with first information indicating a keyword received from the user terminal 3 and an encrypted keyword associated with second information indicating a keyword used for search (S2).

Next, the search device 1 extracts encrypted keywords included in the first teacher data 131 obtained in the processing of S2 (S3). Further, as illustrated in FIG. 6, the search device 1 generates second teacher data 132 in which, of a plurality of encrypted keywords that are included in the encrypted keywords extracted in the processing of S3 and whose plain texts match each other, another encrypted keyword than one encrypted keyword is replaced with the one encrypted keyword (S4).

Thereafter, as illustrated in FIG. 6, the search device 1 performs machine learning of an evaluation model 134 that converts encrypted keywords associated with the first information among the encrypted keywords included in the second teacher data 132 generated in the processing of S4 into encrypted keywords associated with the second information (S5).

For example, the search device 1 performs machine learning based on the new teacher data in which a plurality of kinds of encrypted keywords generated from a same keyword are replaced with one kind of encrypted keyword. When the search device 1 then receives a search condition, the search device 1 replaces encrypted keywords included in the received search condition with encrypted keywords included in the new teacher data, and then performs keyword addition using the evaluation model 134.

Thus, even when a different encrypted keyword is generated from a same keyword each time, the search device 1 may perform machine learning of teacher data including encrypted keywords.

[Outline of Search Processing]

An outline of the search processing will next be described. FIG. 5 is a flowchart of assistance in explaining an outline of the search processing in the first embodiment.

The search device 1 waits until receiving a search condition from the user terminal 3 (NO in S11). For example, the search device 1 waits until a user inputs a search condition via the user terminal 3, as illustrated in FIG. 7.

When the search device 1 then receives a search condition from the user terminal 3 (YES in S11), the search device 1 determines whether or not the encrypted keyword information 133 to which encrypted keywords included in the first teacher data 131 are added includes an encrypted keyword whose plain text matches that of an encrypted keyword included in the search condition received in the processing of S11 (S12).

When the search device 1 determines as a result that an encrypted keyword whose plain text matches is included (YES in S13), the search device 1 replaces the encrypted keyword included in the search condition with the encrypted keyword whose plain text matches among the encrypted keywords included in the encrypted keyword information 133 (S14). When the search device 1 determines in the processing of S13 that no encrypted keyword whose plain text matches is included (NO in S13), on the other hand, the search device 1 does not perform the processing of S14.

Next, as illustrated in FIG. 7, by using the evaluation model 134 stored in the information storage area 130, the search device 1 converts encrypted keywords included in the search condition received in the processing of S11 or the search condition replaced in the processing of S14 into encrypted words associated with the second information (S15).

Thereafter, as illustrated in FIG. 7, the search device 1 performs a search using the encrypted keywords converted in the processing of S15 (S16). For example, the search device 1 searches the search target data DT stored in the storage device 2 based on the encrypted keywords converted in the processing of S15.

For example, the search device 1 performs replacement such that all of the encrypted keywords included in the search condition become encrypted keywords included in the encrypted keyword information 133 (encrypted keywords included in the second teacher data 132 used when the evaluation model 134 is generated), and then converts the encrypted keywords using the evaluation model 134.

Thus, even when different encrypted data is generated from same plain text each time, the search device 1 may improve search accuracy by using the evaluation model 134 generated in the learning processing.

Details of First Embodiment

Details of the first embodiment will next be described. FIGS. 8 to 11 are flowcharts of assistance in explaining details of the learning processing and the search processing in the first embodiment. In addition, FIGS. 12 to 23 are diagrams of assistance in explaining details of the learning processing and the search processing in the first embodiment. The learning processing and the search processing illustrated in FIGS. 8 to 11 will be described with reference to FIGS. 12 to 23.

[Details of Learning Processing]

Figure 8:
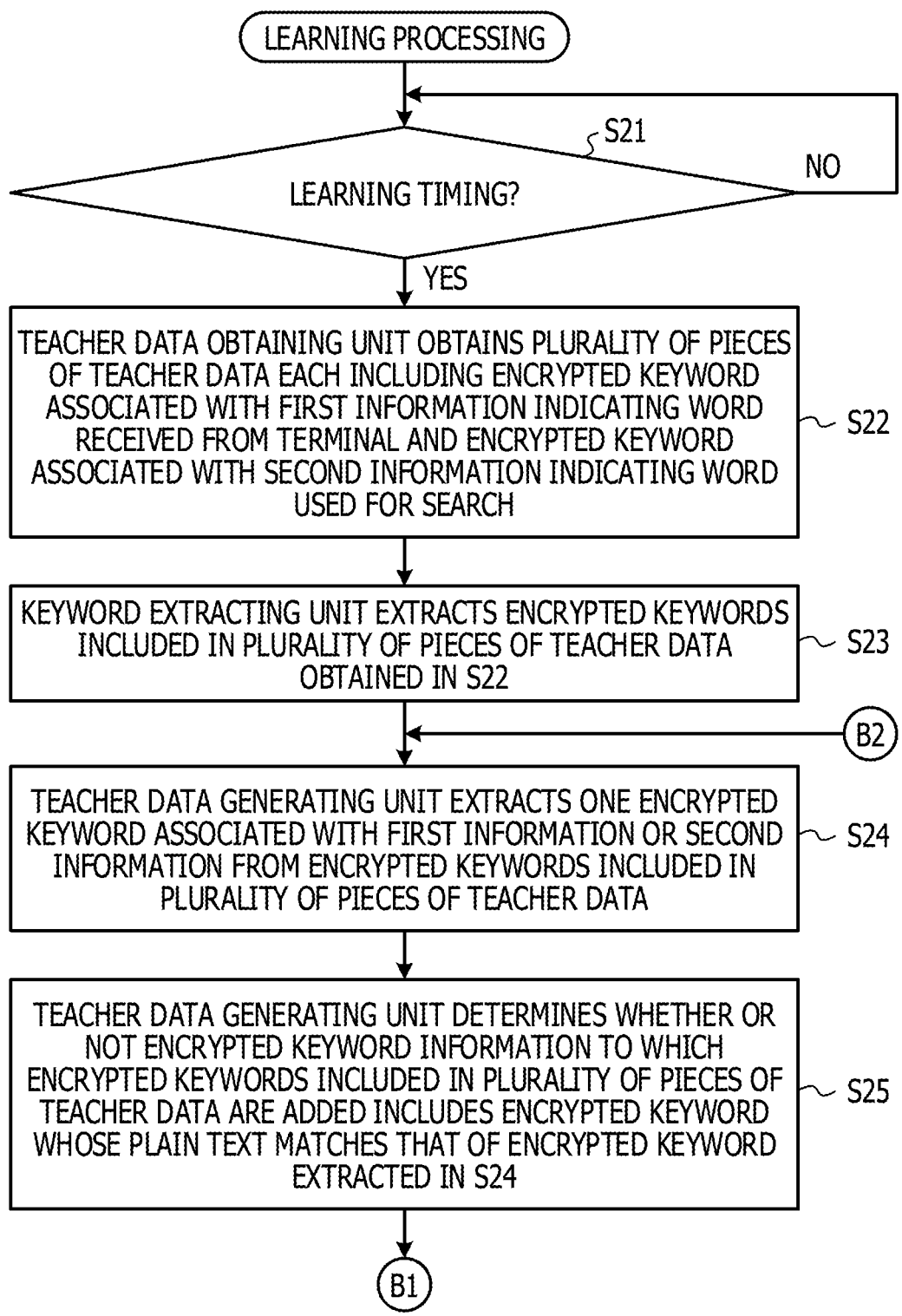
FIG. 8 is a flowchart of assistance in explaining details of the learning processing and the search processing in the first embodiment.
Figure 9:
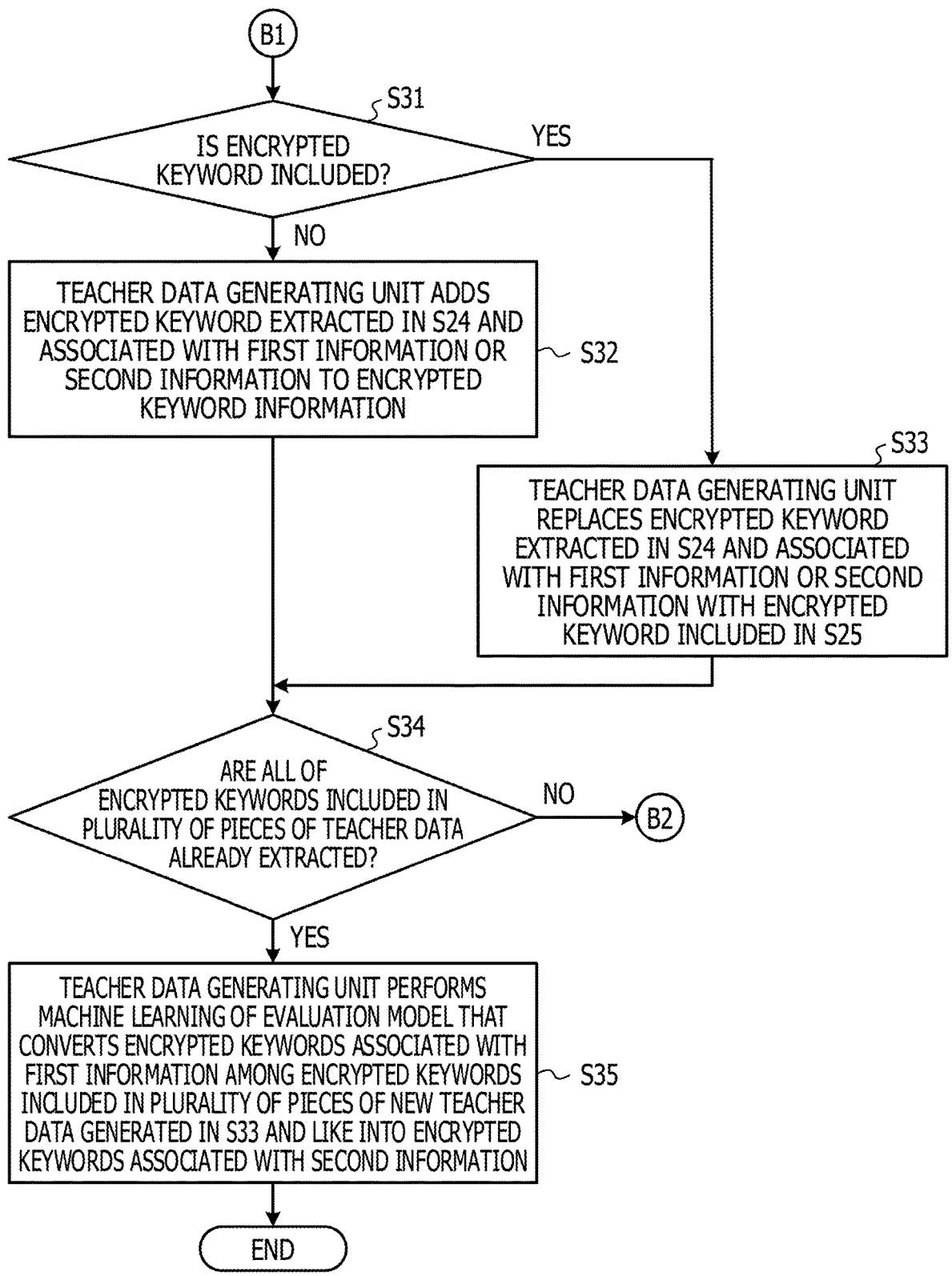
FIG. 9 is a flowchart of assistance in explaining details of the learning processing and the search processing in the first embodiment.

Details of the learning processing will first be described. FIG. 8 and FIG. 9 are flowcharts of assistance in explaining details of the learning processing in the first embodiment.

The teacher data obtaining unit 111 of the search device 1 waits until learning timing (NO in S21). When the learning timing then arrives (YES in S21), the teacher data obtaining unit 111 obtains pieces of first teacher data 131 each including an encrypted keyword associated with first information indicating a keyword received from the user terminal 3 and an encrypted keyword associated with second information indicating a keyword used for search (S22). For example, in this case, the search device 1 starts to generate second teacher data 132.

The keyword extracting unit 112 of the search device 1 thereafter extracts encrypted keywords included in the first teacher data 131 obtained in the processing of S22 (S23). A concrete example of the encrypted keywords extracted from the first teacher data 131 will be described in the following.

[Concrete Example of First Teacher Data]

FIG. 12 is a diagram of assistance in explaining a concrete example of encrypted keywords included in first teacher data. The first teacher data explained with reference to FIG. 12 may be the first teacher data 131 illustrated in FIG. 3. Information illustrated in FIG. 12 includes, as items, an "item number" identifying each piece of information and an "encrypted keyword" in which an encrypted keyword (encrypted keywords) predicted to be included in a search condition transmitted from the search device 1 is (are) set. In addition, the information illustrated in FIG. 12 includes, as an item, an "added keyword" in which an encrypted keyword preferably to be added to search for appropriate search target data DT is set.

For example, in the information illustrated in FIG. 12, information having "1" as the "item number" has a "keyword A" and a "keyword B" set as the "encrypted keyword," and has a "keyword C" set as the "added keyword." In addition, in the information illustrated in FIG. 12, information having "2" as the "item number" has a "keyword D" and a "keyword E" set as the "encrypted keyword," and has a "keyword F" set as the "added keyword." Further, in the information illustrated in FIG. 12, information having "3" as the "item number" has a "keyword G" set as the "encrypted keyword," and has a "keyword H" set as the "added keyword."

Returning to FIG. 8, the teacher data generating unit 113 of the search device 1 extracts one encrypted word associated with the first information or the second information from the encrypted keywords included in the first teacher data 131 (S24). For example, the teacher data generating unit 113 extracts the "keyword A" as information set in the "encrypted keyword" of the information having "1" as the "item number" in the information described with reference to FIG. 12.

Then, the teacher data generating unit 113 determines whether or not the encrypted keyword information 133 to which encrypted keywords included in the first teacher data 131 are added includes an encrypted keyword whose plain text matches that of the encrypted keyword extracted in the processing of S24 (S25). For example, the teacher data generating unit 113 determines whether or not the encrypted keyword information 133 includes an encrypted keyword that is different from the encrypted keywords included in the first teacher data 131 obtained in the processing of S22 and whose plain text matches that of the encrypted keyword extracted in the processing of S24 and associated with the first information or the second information.

When the teacher data generating unit 113 determines as a result that no encrypted keyword whose plain text matches is included (NO in S31), as illustrated in FIG. 9, the teacher data generating unit 113 adds the encrypted keyword extracted in the processing of S24 to the encrypted keyword information 133 (S32).

When the teacher data generating unit 113 determines that an encrypted keyword whose plain text matches is included (YES in S31), on the other hand, the teacher data generating unit 113 replaces the encrypted keyword extracted in the processing of S24 with the encrypted keyword included in the processing of S25 (S33).

Then, after the processing of S32 or S33, the teacher data generating unit 113 determines whether or not all of the encrypted keywords included in the first teacher data 131 obtained in the processing of S22 are extracted (S34).

When a result of the determination indicates that the extraction of all of the encrypted keywords included in the first teacher data 131 obtained in the processing of S22 is not completed, for example, when generation of second teacher data 132 is not completed (NO in S34), the teacher data generating unit 113 performs the processing from S24 on down again. The following description will be made of a concrete example of the processing from S24 to S34.

[Concrete Example of Processing from S24 to S34]

FIGS. 13 to 18 are diagrams of assistance in explaining a concrete example of the processing from S24 to S34. For example, FIGS. 13 to 18 are diagrams of assistance in explaining a concrete example of a process of generating the encrypted keyword information 133.

Figure 13:
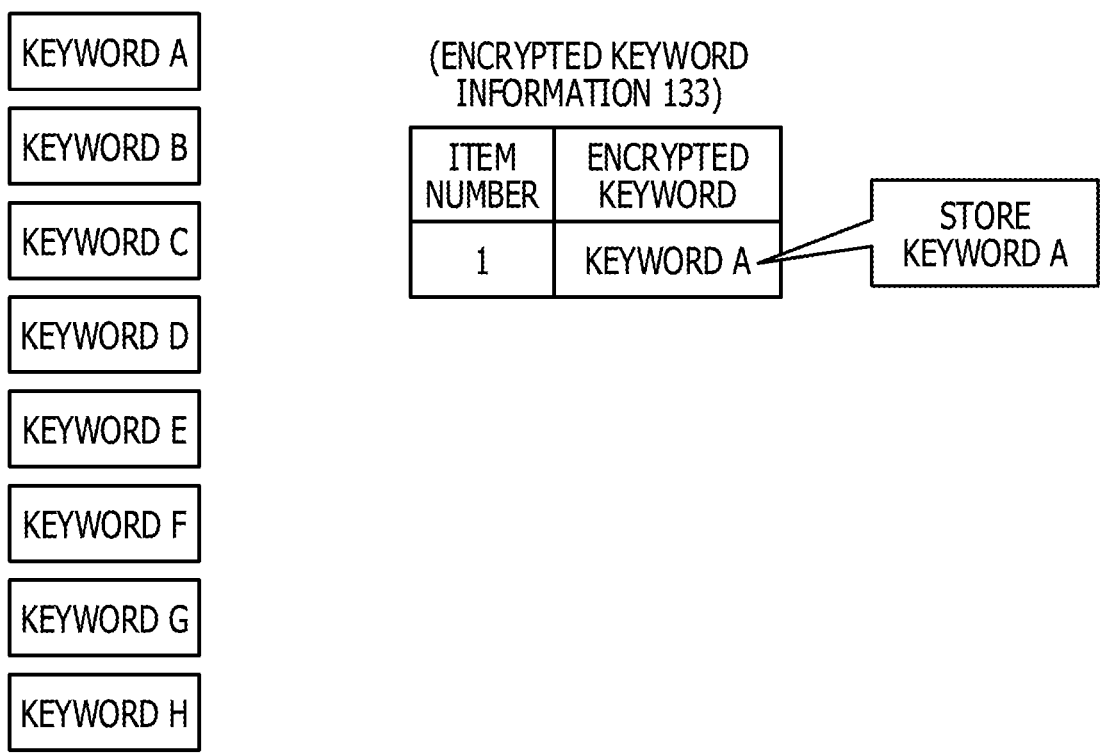
FIG. 13 is a diagram of assistance in explaining a concrete example of processing from S24 to S34.

First, the teacher data generating unit 113, for example, obtains the "keyword A" set in the "encrypted keyword" of the information having "1" as the "item number" in the information described with reference to FIG. 12, and determines whether or not the encrypted keyword information 133 includes an encrypted keyword whose plain text is the same as that of the obtained "keyword A" (S24 and S25). In this case, no encrypted keyword is set yet in the encrypted keyword information 133. Therefore, as illustrated in FIG. 13, the teacher data generating unit 113, for example, sets the "keyword A" as the "encrypted keyword" of information having "1" as an "item number" in the encrypted keyword information 133 (NO in S31, S32, and NO in S34).

Figure 14:
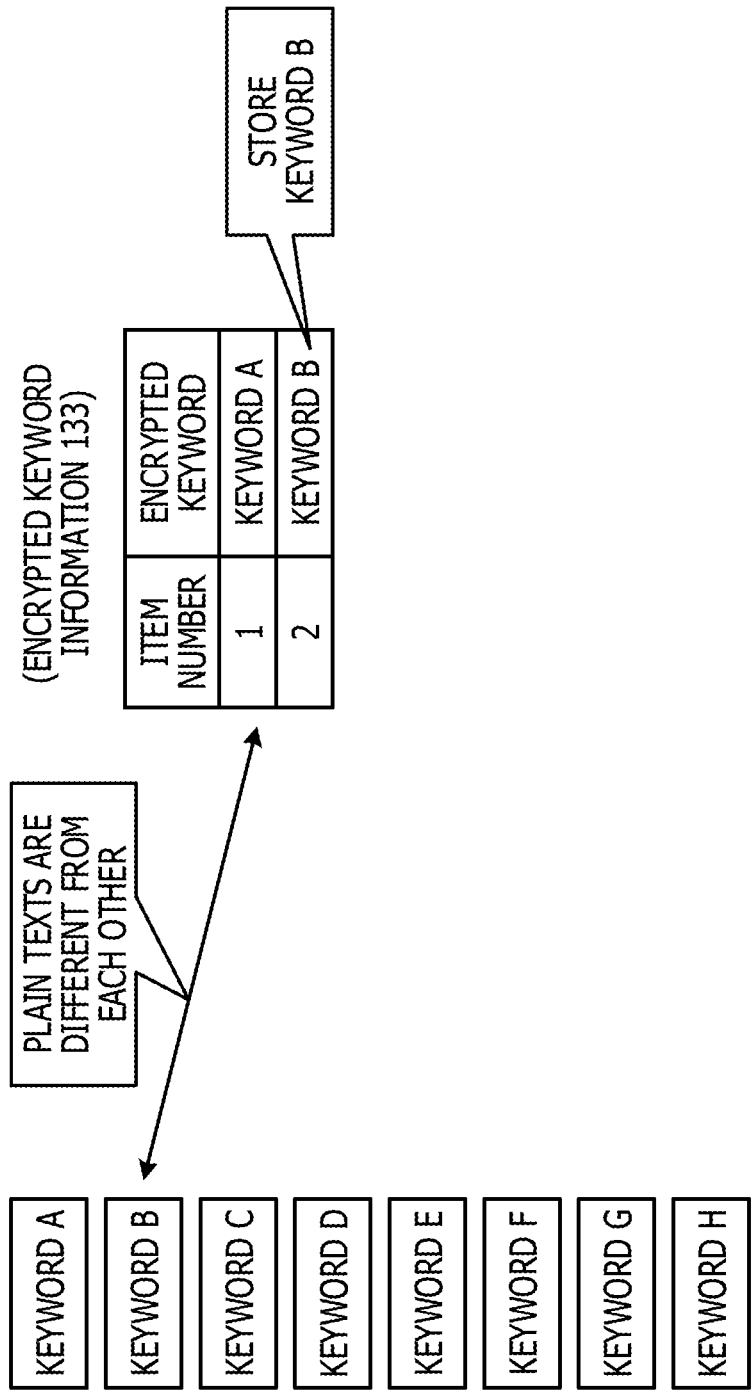
FIG. 14 is a diagram of assistance in explaining the concrete example of the processing from S24 to S34.

Next, the teacher data generating unit 113, for example, obtains the "keyword B" set in the "encrypted keyword" of the information having "1" as the "item number" in the information described with reference to FIG. 12, and determines whether or not the encrypted keyword information 133 includes an encrypted keyword whose plain text is the same as that of the obtained "keyword B" (S24 and S25). In this case, as illustrated in FIG. 13, the "keyword A" is set in the encrypted keyword information 133. Therefore, the teacher data generating unit 113 determines whether or not the plain text of the "keyword A" and the plain text of the "keyword B" match each other. When a result of the determination indicates that the plain text of the "keyword A" and the plain text of the "keyword B" are different from each other, the teacher data generating unit 113, for example, sets the "keyword B" in the "encrypted keyword" of information having "2" as the "item number" in the encrypted keyword information 133, as illustrated in FIG. 14 (NO in S31, S32, and NO in S34).

Figure 15:
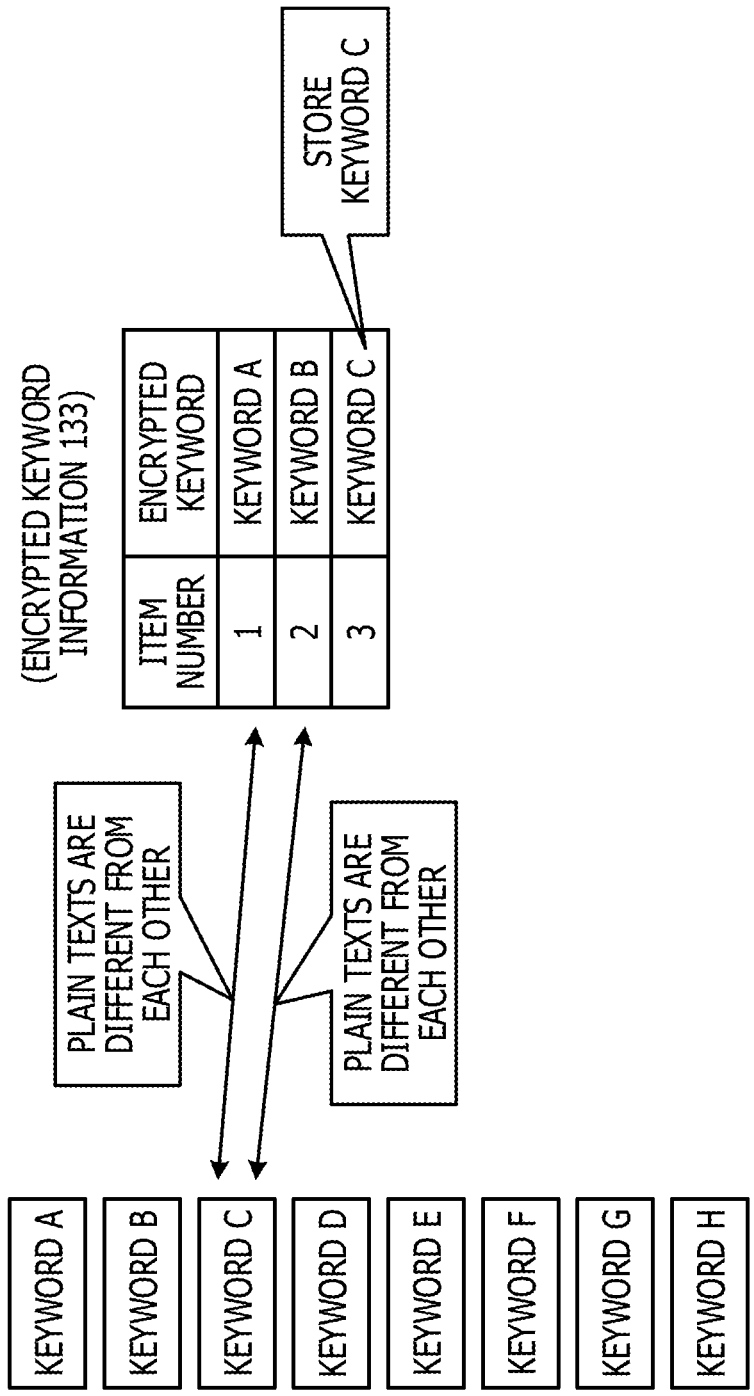
FIG. 15 is a diagram of assistance in explaining the concrete example of the processing from S24 to S34.

Next, the teacher data generating unit 113, for example, obtains the "keyword C" set as the "added keyword" of the information having "1" as the "item number" in the information described with reference to FIG. 12, and determines whether or not the encrypted keyword information 133 includes an encrypted keyword whose plain text is the same as that of the obtained "keyword C" (S24 and S25). In this case, as illustrated in FIG. 14, the "keyword A" and the "keyword B" are set in the encrypted keyword information 133. Therefore, the teacher data generating unit 113 determines whether or not the plain text of the "keyword C" matches the plain text of the "keyword A" or the plain text of the "keyword B." When a result of the determination indicates that the plain text of the "keyword C" is different from the plain text of the "keyword A" and the plain text of the "keyword B," the teacher data generating unit 113, for example, set the "keyword C" as the "encrypted keyword" of information having "3" as the "item number" in the encrypted keyword information 133, as illustrated in FIG. 15 (NO in S31, S32, and NO in S34).

Figure 16:
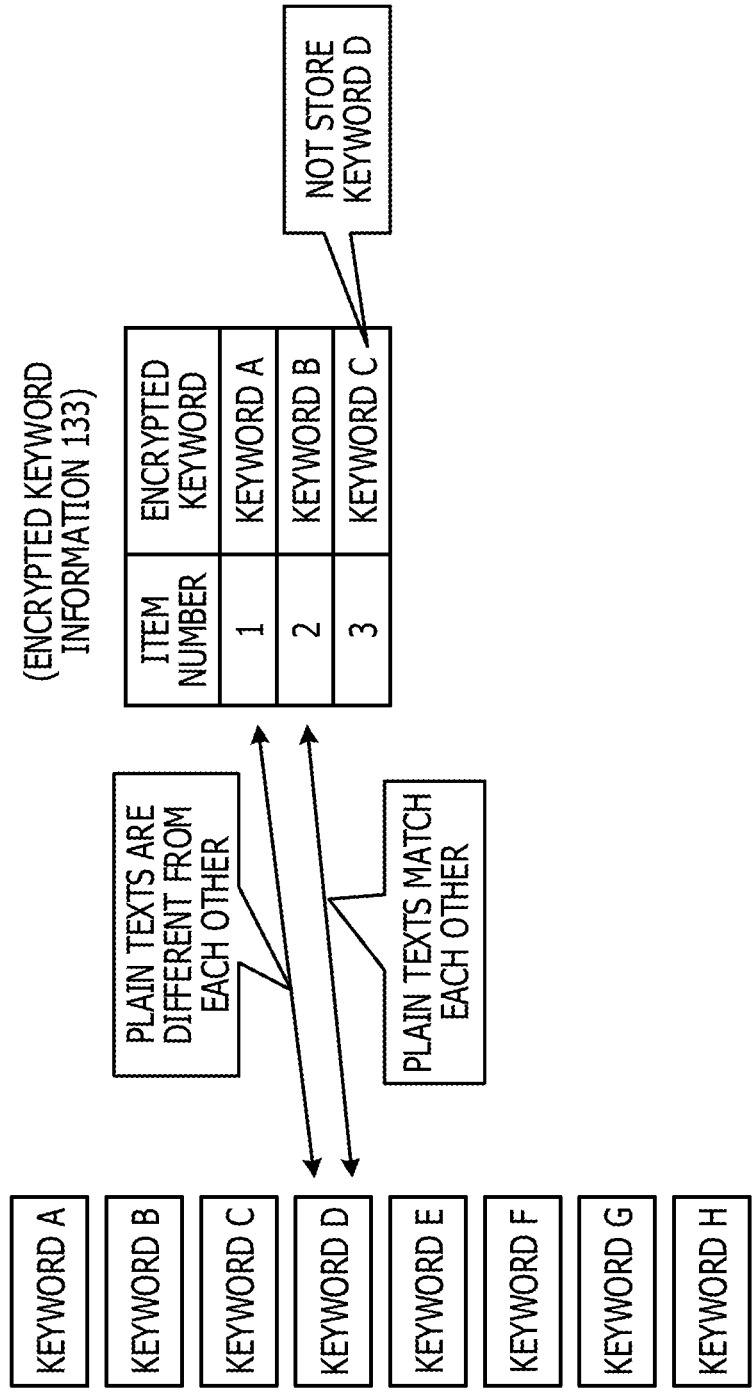
FIG. 16 is a diagram of assistance in explaining the concrete example of the processing from S24 to S34.

Next, the teacher data generating unit 113, for example, obtains the "keyword D" set in the "encrypted keyword" of the information having "2" as the "item number" in the information described with reference to FIG. 12, and determines whether or not the encrypted keyword information 133 includes an encrypted keyword whose plain text is the same as that of the obtained "keyword D" (S24 and S25). In this case, as illustrated in FIG. 15, the "keyword A," the "keyword B," and the "keyword C" are set in the encrypted keyword information 133. Therefore, the teacher data generating unit 113 determines whether or not the plain text of the "keyword D" matches one of the plain texts of the "keyword A," the "keyword B," and the "keyword C." When a result of the determination indicates that the plain text of the "keyword D" matches the plain text of the "keyword B," the teacher data generating unit 113 does not set the "keyword D" in the encrypted keyword information 133, as illustrated in FIG. 16 (YES in S31).

Figure 17:
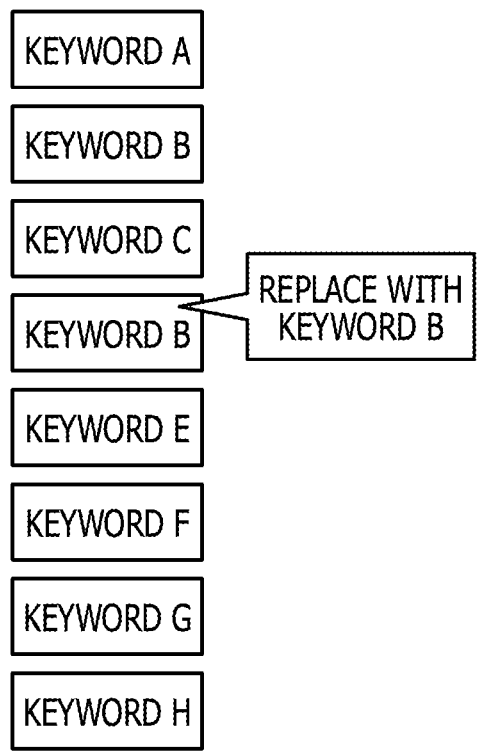
FIG. 17 is a diagram of assistance in explaining the concrete example of the processing from S24 to S34.

Then, in this case, as illustrated in FIG. 17, the teacher data generating unit 113 replaces the "keyword D" as an encrypted keyword included in the first teacher data 131 with the "keyword B" whose plain text matches that of the "keyword D" (S33).

Figure 18:
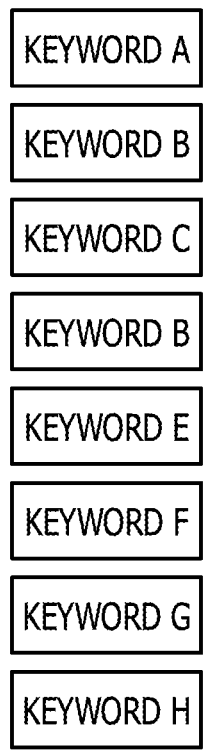
FIG. 18 is a diagram of assistance in explaining the concrete example of the processing from S24 to S34.

Thereafter, as illustrated in FIG. 18, the teacher data generating unit 113 performs the processing from S24 to S33 for all of the encrypted keywords included in the first teacher data 131, and thereby generates the encrypted keyword information 133. For example, as illustrated in FIG. 18, the teacher data generating unit 113 generates the encrypted keyword information 133 including the "keyword A," the "keyword B," the "keyword C," the "keyword E," the "keyword F," the "keyword G," and the "keyword H" as encrypted keywords.

Returning to FIG. 9, when all of the encrypted keywords included in the first teacher data 131 obtained in the processing of S22 are already extracted, for example, when the generation of the second teacher data 132 is completed (YES in S34), the teacher data generating unit 113 performs machine learning of the evaluation model 134 that converts encrypted keywords associated with the first information among the encrypted keywords included in the second teacher data 132 generated in the processing of S33 and the like into encrypted keywords associated with the second information (S35).

Thus, even when different encrypted data is generated from same plain text each time, the search device 1 may perform machine learning of the evaluation model 134. A concrete example of the second teacher data 132 will be described in the following.

[Concrete Example of Second Teacher Data]

FIG. 19 is a diagram of assistance in explaining a concrete example of encrypted keywords included in second teacher data. The second teacher data explained with reference to FIG. 19 may be the second teacher data 132 illustrated in FIG. 3. Information illustrated in FIG. 19 includes the same items as the first teacher data 131 described with reference to FIG. 12.

For example, in the information illustrated in FIG. 19, information having "1" as the "item number" has the "keyword A" and the "keyword B" set as the "encrypted keyword," and has the "keyword C" set as the "added keyword."

In addition, in the information illustrated in FIG. 19, information having "2" as the "item number" has the "keyword B" and the "keyword E" set as the "encrypted keyword," and has the "keyword F" set as the "added keyword." Further, in the information illustrated in FIG. 19, information having "3" as the "item number" has the "keyword G" set as the "encrypted keyword," and has the "keyword H" set as the "added keyword."

For example, unlike the information described with reference to FIG. 12, the "keyword E" and the "keyword B" are set as the "encrypted keyword" of the information having "2" as the "item number" in the information illustrated in FIG. 19.

[Details of Search Processing]

Figure 10:
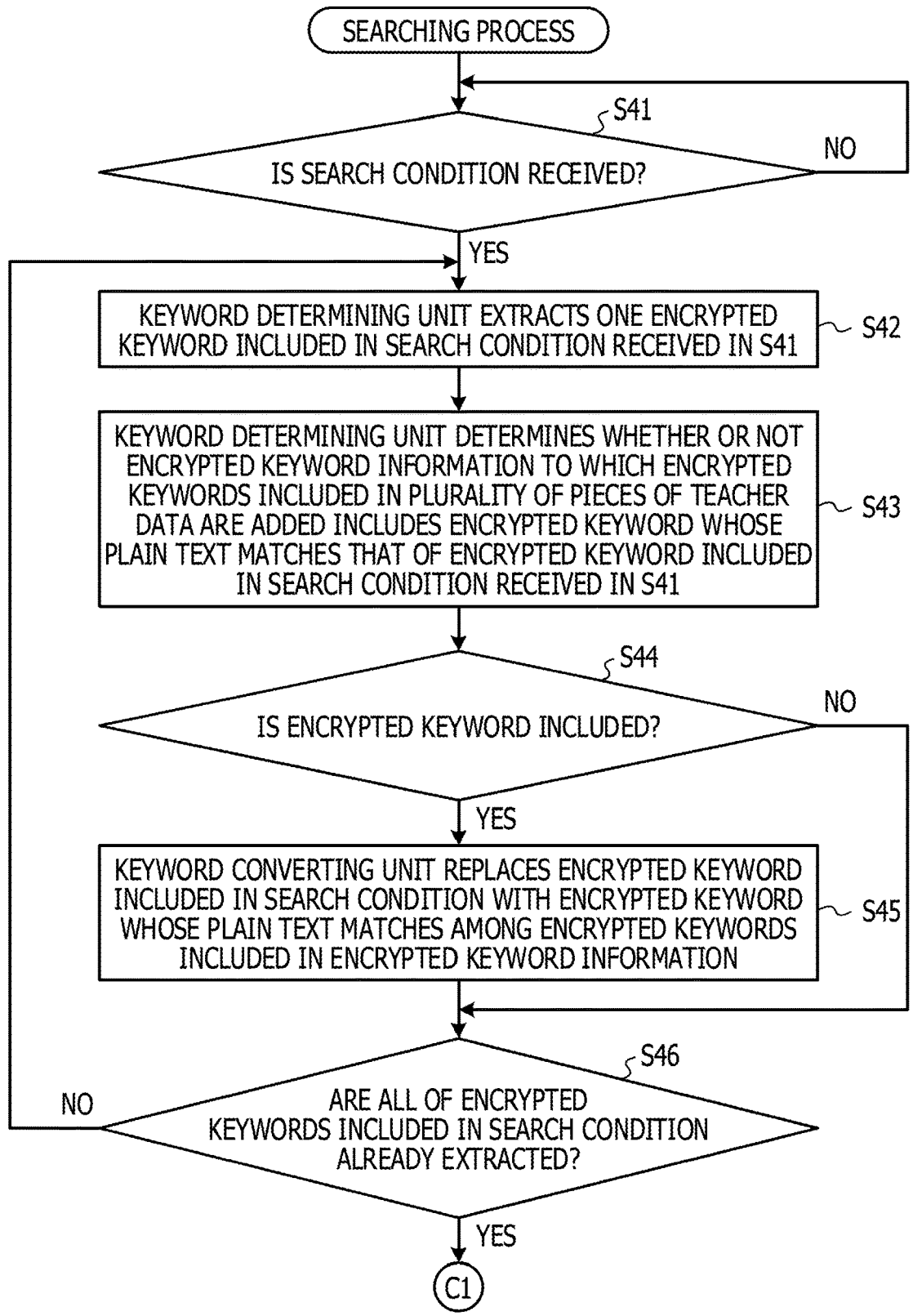
FIG. 10 is a flowchart of assistance in explaining details of the learning processing and the search processing in the first embodiment.
Figure 11:
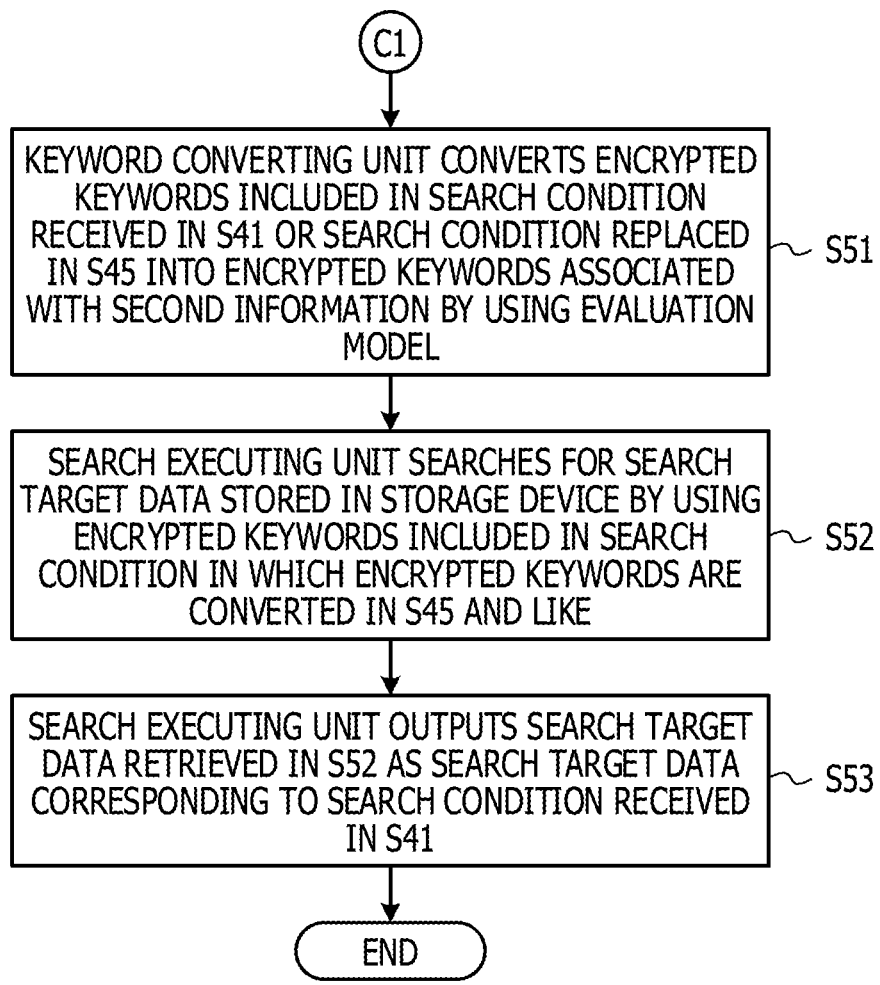
FIG. 11 is a flowchart of assistance in explaining details of the learning processing and the search processing in the first embodiment.

Details of the search processing will next be described. FIG. 10 and FIG. 11 are flowcharts of assistance in explaining details of the search processing in the first embodiment.

As illustrated in FIG. 10, the search condition receiving unit 115 of the search device 1 waits until receiving a search condition from the user terminal 3 (NO in S41). When a search condition is then received from the user terminal 3 (YES in S41), the keyword determining unit 116 of the search device 1 extracts one encrypted keyword included in the search condition received in the processing of S41 (S42).

Thereafter, the keyword determining unit 116 determines whether or not the encrypted keyword information 133 to which encrypted keywords included in the first teacher data 131 are added includes an encrypted keyword whose plain text matches that of the encrypted keyword included in the search condition received in the processing of S41 (S43).

When it is determined as a result that an encrypted keyword whose plain text matches is included (YES in S44), the keyword converting unit 117 of the search device 1 replaces the encrypted keyword included in the search condition with the encrypted keyword whose plain text matches among the encrypted keywords included in the encrypted keyword information 133 (S45). When it is determined in the processing of S44 that no encrypted keyword whose plain text matches is included (NO in S44), on the other hand, the search device 1 does not perform the processing of S45.

Then, whether or not all of the encrypted keywords included in the search condition received in the processing of S41 are extracted is determined (S46).

When a result of the determination indicates that the extraction of all of the encrypted keywords included in the search condition received in the processing of S41 is not completed (NO in S46), the keyword determining unit 116 performs the processing from S42 on down again. A concrete example of the processing from S42 to S45 will be described in the following.

[Concrete Example of Processing from S42 to S46]

FIGS. 20 to 23 are diagrams of assistance in explaining a concrete example of the processing from S42 to S45. For example, FIGS. 20 to 23 are diagrams of assistance in explaining a concrete example of a process of replacing encrypted keywords included in the search condition. Incidentally, the following description will be made supposing that the search condition received in the processing of S41 includes a "keyword I," a "keyword J," a "keyword K," a "keyword L," a "keyword M," a "keyword N," and a "keyword O" as encrypted keywords. In addition, description will be made supposing that the encrypted keyword information 133 described with reference to FIG. 18 is referred to in the processing of S43.

Figure 20:
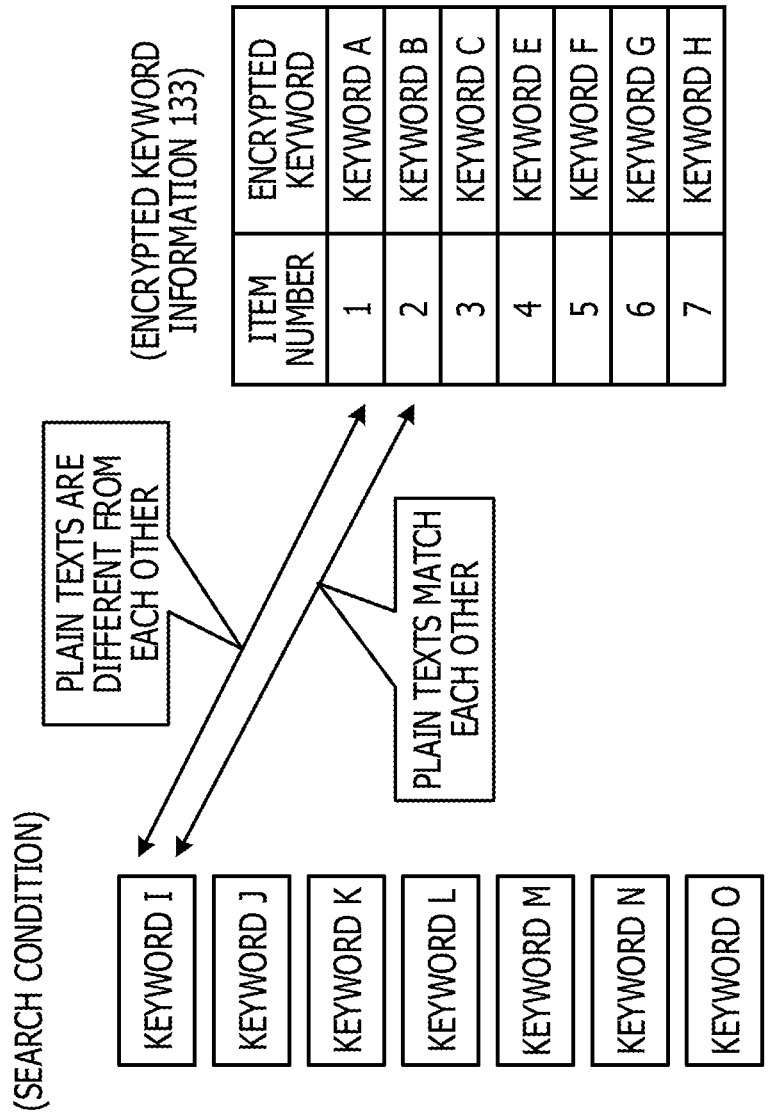
FIG. 20 is a diagram of assistance in explaining a concrete example of processing from S42 to S45.
Figure 21:
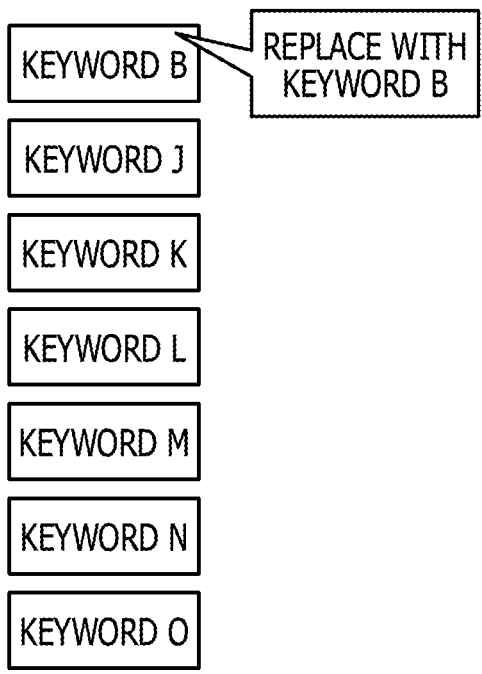
FIG. 21 is a diagram of assistance in explaining the concrete example of the processing from S42 to S45.

First, the teacher data generating unit 113, for example, obtains the "keyword I" among the encrypted keywords included in the search condition received in the processing of S41, and determines whether or not the encrypted keyword information 133 includes an encrypted keyword whose plain text is the same as that of the obtained "keyword I" (S42 and S43). Here, set in the encrypted keyword information 133 described with reference to FIG. 18 are the "keyword A," the "keyword B," the "keyword C," the "keyword E," the "keyword F," the "keyword G," and the "keyword H." Therefore, the teacher data generating unit 113 determines whether or not the plain text of the "keyword I" matches the plain text of the "keyword A," the "keyword B," the "keyword C," the "keyword E," the "keyword F," the "keyword G," or the "keyword H." When a result of the determination indicates that the plain text of the "keyword I" and the plain text of the "keyword B" match each other as illustrated in FIG. 20, the teacher data generating unit 113 replaces the "keyword I" among the encrypted keywords included in the search condition received in the processing of S41 with the "keyword B" whose plain text matches that of the "keyword I," as illustrated in FIG. 21.

Figure 22:
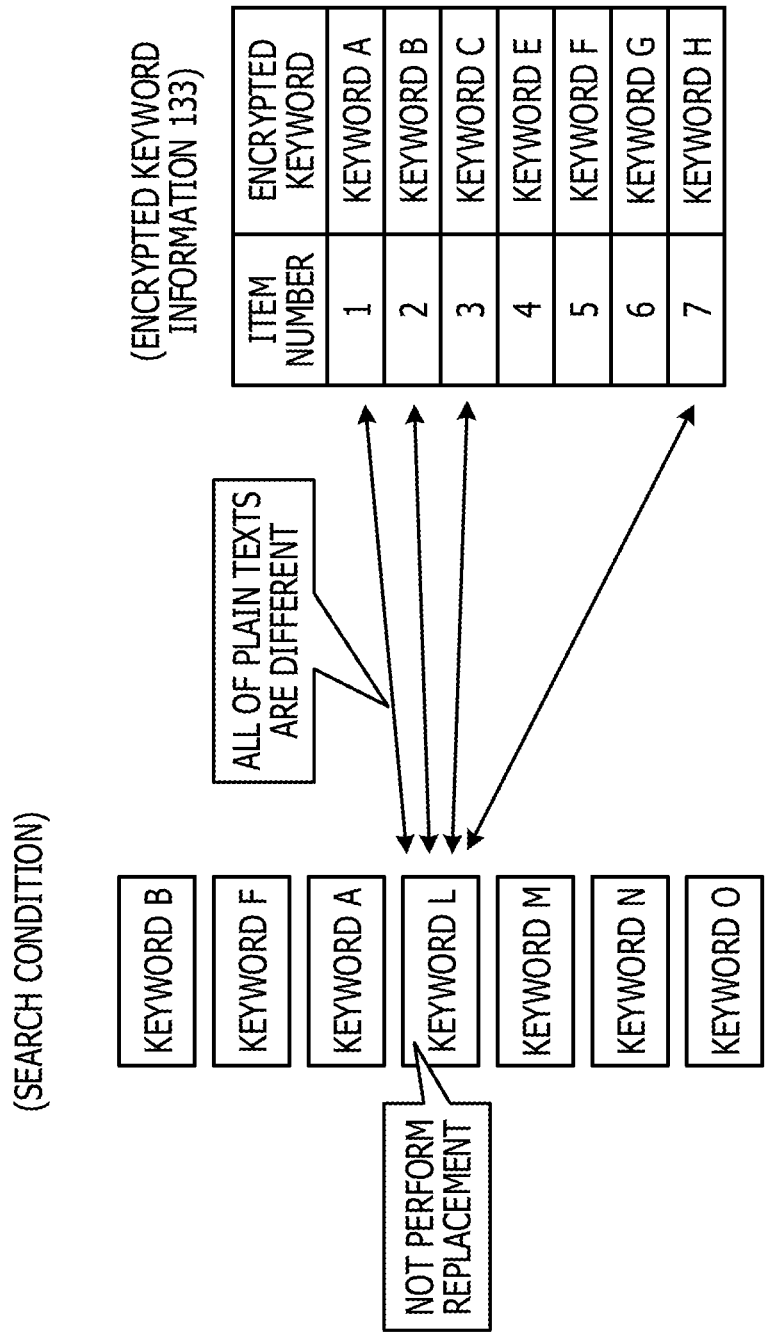
FIG. 22 is a diagram of assistance in explaining the concrete example of the processing from S42 to S45.

In addition, the teacher data generating unit 113, for example, obtains the "keyword L" among the encrypted keywords included in the search condition received in the processing of S41, and determines whether or not the encrypted keyword information 133 includes an encrypted keyword whose plain text is the same as that of the obtained "keyword L" (S42 and S43). For example, as illustrated in FIG. 22, the teacher data generating unit 113 determines whether or not the plain text of the "keyword L" matches the plain text of the "keyword A," the "keyword B," the "keyword C," the "keyword E," the "keyword F," the "keyword G," or the "keyword H." When a result of the determination indicates that the plain text of the "keyword L" is different from each of the plain texts of the "keyword A," the "keyword B," the "keyword C," the "keyword E," the "keyword F," the "keyword G," and the "keyword H," the teacher data generating unit 113 does not replace the encrypted keyword included in the search condition received in the processing of S41, as illustrated in FIG. 22.

Thereafter, as illustrated in FIG. 23, the teacher data generating unit 113 performs the processing from S42 to S46 for all of the encrypted keywords included in the search condition received in the processing of S41, and thereby replaces encrypted keywords included in the search condition received in the processing of S41. For example, the teacher data generating unit 113 replaces encrypted keywords included in the search condition so as to include the "keyword B," the "keyword F," the "keyword A," the "keyword L," the "keyword B," the "keyword E," and the "keyword A" as encrypted keywords, as illustrated in FIG. 23.

Returning to FIG. 10, when the extraction of all of the encrypted keywords included in the search condition received in the processing of S41 is completed (YES in S46), the keyword converting unit 117 converts encrypted keywords included in the search condition received in S41 or the search condition replaced in S45 into encrypted keywords associated with the second information, by using the evaluation model 134 stored in the information storage area 130, as illustrated in FIG. 11 (S51). For example, the keyword converting unit 117 converts the encrypted keywords by using the evaluation model 134 generated in the learning processing.

Then, the search executing unit 118 of the search device 1 searches for search target data DT stored in the storage device 2 by using the encrypted keywords included in the search condition in which encrypted keywords are converted in the processing of S45 and the like (S52). The search executing unit 118 thereafter outputs the search target data DT retrieved in the processing of S52 as the search target data DT corresponding to the search condition received in the processing of S41 (S53). For example, the search executing unit 118, for example, transmits the search target data DT retrieved in the processing of S52 to the user terminal 3 that transmitted the search condition received in the processing of S41.

Thus, the search device 1 in the present embodiment obtains a plurality of pieces of teacher data each including an encrypted keyword associated with first information indicating a keyword received from the user terminal 3 and an encrypted keyword associated with second information indicating a word used for search.

Then, the search device 1 extracts encrypted keywords included in the obtained plurality of pieces of teacher data. Further, the search device 1 generates a plurality of pieces of new teacher data in which, of a plurality of encrypted keywords that are included in the extracted encrypted keywords and whose keywords before encryption match each other, another encrypted keyword than one encrypted keyword is replaced with the one encrypted keyword.

Thereafter, the search device 1 performs machine learning of an evaluation model 134 that converts encrypted keywords associated with the first information among the encrypted keywords included in the generated plurality of pieces of new teacher data into encrypted keywords associated with the second information.

For example, the search device 1 performs machine learning based on new teacher data in which a plurality of kinds of encrypted keywords generated from a same keyword are replaced with one kind of encrypted keyword. When the search device 1 then receives a search condition, the search device 1 replaces encrypted keywords included in the received search condition with encrypted keywords included in the new teacher data, and then performs keyword addition using the evaluation model 134.

Thus, even when a different encrypted keyword is generated from a same keyword each time, the search device 1 may perform machine learning of teacher data including encrypted keywords, so that search accuracy may be improved.

All examples and conditional language recited herein are intended for pedagogical purposes to aid the reader in understanding the invention and the concepts contributed by the inventor to furthering the art, and are to be construed as being without limitation to such For example recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A machine learning method performed by a computer, the machine learning method comprising:
   obtaining a first plurality of pieces of teacher data, each of the first plurality of pieces of teacher data including first encrypted words and corresponding search word information, each of the first encrypted words being an encrypted word generated in a terminal device from a word inputted to the terminal device such that the encrypted word is represented by a code sequence different from other encrypted words even though both of the encrypted word and the other encrypted words have been generated from a same word, the search word information including one or more second encrypted words to be used for search in response to receiving the first encrypted words from the terminal device;

obtaining a group of words from among the first encrypted words by using a trapdoor scheme, the obtained group of words being encrypted words determined to have been generated from a same word;

generating a second plurality of pieces of teacher data by using one encrypted word included in the obtained group of words to replace a rest of the obtained group of words in the first plurality of pieces of teacher data; and performing, by using the second plurality of pieces of teacher data, machine learning of a parameter to determine, in response to receiving of one or more encrypted words, one or more encrypted words to be used for search.

2. The machine learning method according to claim 1, wherein the generating the second plurality of pieces of teacher data includes:

adding the second encrypted word into reference information, and determining whether the reference information includes an encrypted word whose plain text is equal to the plain text of the first encrypted word.

3. The machine learning method according to claim 2, wherein the generating the second plurality of pieces of teacher data includes:

determining whether the reference information includes an encrypted word whose plain text is equal to a plain text of a third encrypted word included in the first plurality of pieces of teacher data, and adding the third encrypted word into the reference information when no encrypted word whose plain text is equal to the plain text of the third encrypted word is included in the reference information.

4. The machine learning method according to claim 2, further comprising:

receiving a search condition from a terminal;

determining whether the reference information includes an encrypted word whose plain text is equal to a plain text of a third encrypted word included in the search condition;

changing the third encrypted word into a fourth encrypted word when it is determined that the reference information includes the fourth encrypted word whose plain text is equal to the plain text of the third encrypted word;

determining a fifth encrypted word on the basis of the parameter and the fourth encrypted word; and performing a search using the fifth encrypted word.

5. The machine learning method according to claim 4, wherein the third encrypted word is different from the fourth encrypted word.

6. The machine learning method according to claim 4, wherein plain texts of encrypted words included in the reference information are different from each other.

7. A machine learning device comprising:

a memory; and a processor coupled to the memory and the processor configured to:

obtain a first plurality of pieces of teacher data, each of the first plurality of pieces of teacher data including first encrypted words and corresponding search word information, each of the first encrypted words being an encrypted word generated in a terminal device from a word inputted to the terminal device such that the encrypted word is represented by a code sequence different from other encrypted words even though both of the encrypted word and the other encrypted words have been generated from a same word, the search word information including one or more second encrypted words to be used for search in response to receiving the first encrypted words from the terminal device;

obtain a group of words from among the first encrypted words by using a trapdoor scheme, the obtained group of words being encrypted words determined to have been generated from a same word;

perform a generation of a second plurality of pieces of teacher data by using one encrypted word included in the obtained group of words to replace a rest of the obtained group of words in the first plurality of pieces of teacher data; and perform, by using the second plurality of pieces of teacher data, machine learning of a parameter to determine, in response to receiving of one or more encrypted words, one or more encrypted words to be used for search.

8. The machine learning device according to claim 7, wherein the generation includes:

adding the second encrypted word into reference information, and determining whether the reference information includes an encrypted word whose plain text is equal to the plain text of the first encrypted word.

9. The machine learning device according to claim 8, wherein the generation includes:

determining whether the reference information includes an encrypted word whose plain text is equal to a plain text of a third encrypted word included in the first plurality of pieces of teacher data, and adding the third encrypted word into the reference information when no encrypted word whose plain text is equal to the plain text of the third encrypted word is included in the reference information.

10. The machine learning device according to claim 8, the processor further configured to:

receive a search condition from a terminal, determine whether the reference information includes an encrypted word whose plain text is equal to a plain text of a third encrypted word included in the search condition, change the third encrypted word into a fourth encrypted word when it is determined that the reference information includes the fourth encrypted word whose plain text is equal to the plain text of the third encrypted word, determine a fifth encrypted word on the basis of the parameter and the fourth encrypted word, and perform a search using the fifth encrypted word.

11. The machine learning device according to claim 10, wherein the third encrypted word is different from the fourth encrypted word.

12. The machine learning device according to claim 10, wherein plain texts of encrypted words included in the reference information are different from each other.

13. A non-transitory computer-readable medium storing a machine learning program that causes a computer to execute a process comprising:

obtaining a first plurality of pieces of teacher data, each of the first plurality of pieces of teacher data including first encrypted words and corresponding search word information, each of the first encrypted words being an encrypted word generated in a terminal device from a word inputted to the terminal device such that the encrypted word is represented by a code sequence different from other encrypted words even though both of the encrypted word and the other encrypted words have been generated from a same word, the search word information including one or more second encrypted words to be used for search in response to receiving the first encrypted words from the terminal device;

obtaining a group of words from among the first encrypted words by using a trapdoor scheme, the obtained group of words being encrypted words determined to have been generated from a same word;

generating a second plurality of pieces of teacher data by using one encrypted word included in the obtained group of words to replace a rest of the obtained group of words in the first plurality of pieces of teacher data; and performing, by using the second plurality of pieces of teacher data, machine learning of a parameter to determine, in response to receiving of one or more encrypted words, one or more encrypted words to be used for search.

* * * * *